(12) United States Patent
Malkiel et al.

(10) Patent No.: US 11,580,764 B2
(45) Date of Patent: Feb. 14, 2023

(54) SELF-SUPERVISED DOCUMENT-TO-DOCUMENT SIMILARITY SYSTEM

(71) Applicant: Microsoft Technology Licensing, LLC, Redmond, WA (US)

(72) Inventors: Itzik Malkiel, Givaatayim (IL); Dvir Ginzburg, Tel Aviv (IL); Noam Koenigstein, Tel Aviv (IL); Oren Barkan, Tel Aviv (IL); Nir Nice, Salit (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/354,333

(22) Filed: Jun. 22, 2021

(65) Prior Publication Data
US 2022/0405504 A1  Dec. 22, 2022

(51) Int. Cl.
*G06V 30/418* (2022.01)
*G06K 9/62* (2022.01)
*G06V 10/75* (2022.01)

(52) U.S. Cl.
CPC .......... *G06V 30/418* (2022.01); *G06K 9/623* (2013.01); *G06K 9/6263* (2013.01); *G06V 10/751* (2022.01)

(58) Field of Classification Search
CPC ............ G06T 7/11; G06T 2207/30176; G06V 10/751; G06V 30/414
See application file for complete search history.

(56) References Cited

U.S. PATENT DOCUMENTS

| | | | | |
|---|---|---|---|---|
| 7,174,332 B2 * | 2/2007 | Baxter | ................ | G06F 11/1435 710/200 |
| 8,139,870 B2 * | 3/2012 | Kato | .................... | G06V 10/768 382/229 |
| 8,824,751 B2 * | 9/2014 | Wise | ..................... | G06V 40/172 709/232 |
| 8,831,361 B2 * | 9/2014 | Pintsov | ................ | G06V 30/418 382/209 |
| 9,558,158 B2 * | 1/2017 | Gusakov | ................. | G06F 40/58 |
| 9,632,994 B2 * | 4/2017 | Naim | ..................... | G06F 40/279 |

(Continued)

OTHER PUBLICATIONS

Beltagy,, et al., "Longformer: The long-document transformer", In Repository of arXiv:2004.05150v2, Dec. 2, 2020, pp. 1-17.

(Continued)

*Primary Examiner* — Yosef Kassa

(57) ABSTRACT

Examples provide a self-supervised language model for document-to-document similarity scoring and ranking long documents of arbitrary length in an absence of similarity labels. In a first stage of a two-staged hierarchical scoring, a sentence similarity matrix is created for each paragraph in the candidate document. A sentence similarity score is calculated based on the sentence similarity matrix. In the second stage, a paragraph similarity matrix is constructed based on aggregated sentence similarity scores associated with the first candidate document. A total similarity score for the document is calculated based on the normalize the paragraph similarity matrix for each candidate document in a collection of documents. The model is trained using a masked language model and intra-and-inter document sampling. The documents are ranked based on the similarity scores for the documents.

20 Claims, 17 Drawing Sheets

(56) References Cited

U.S. PATENT DOCUMENTS 9,870,358 B2 * 1/2018 Le Chevalier ...... G06F 16/3334
2008/0319973 A1 12/2008 Thambiratnam et al.

OTHER PUBLICATIONS

Blei, et al., "Latent Dirichlet Allocation", In Journal of Machine Learning Research, vol. 3, Issue 30, Mar. 1, 2003, 30 Pages.
Caciularu, et al., "Cross-document language modeling", In Repository of arXiv:2101.00406v1, Jan. 2, 2021, 13 Pages.
Cohan, et al., "SPECTER: Document-level representation learning using citation-informed transformers", In Proceedings of the 58th Annual Meeting of the Association for Computational Linguistics, Jul. 5, 2020, pp. 2270-2282.
Devlin, et al., "BERT: Pre-training of Deep Bidirectional Transformers for Language Understanding", In Proceedings of the Conference of the North American Chapter of the Association for Computational Linguistics: Human language Technologies (NAACL 2019), Jun. 2019, pp. 4171-4186.
Gururangan, et al., "Don't stop pretraining: Adapt language models to domains and tasks", In Repository of arXiv:2004.10964v3, May 5, 2020, 19 Pages.
Hadsell, et al., "Dimensionality Reduction by Learning an Invariant Mapping", In Proceedings of IEEE Computer Society Conference on Computer Vision and Pattern Recognition, Jun. 17, 2006, pp. 1-8.
Jiang, et al., "Semantic text matching for long-form documents.", In Proceedings of the Word Wide Web Conference, May 2019, 11 Pages.
Liu, et al., "RoBERTa: A Robustly Optimized BERT Pretraining Approach", In Repository of arXiv:1907.11692v1, Jul. 26, 2019, 13 Pages.
Newman, et al., "Automatic evaluation of topic coherence", In Human language technologies: The annual conference of the North American chapter of the association for computational linguistics, Jun. 2010, pp. 100-108.
Reimers, et al., "Sentence embeddings using siamese bertnetworks.", In Repository of arXiv:1908.10084v1, Aug. 27, 2019, 11 Pages.
Sun, et al., "Stance detection with hierarchical attention network", In Proceedings of the 27th of International Conference on Computational Linguistics, Aug. 2018, pp. 2399-2409.
Wang, et al., "Glue: A multi-task benchmark and analysis platform for natural language understanding", In Proceedings of the EMNLP Workshop BlackboxNLP: Analyzing and Interpreting Neural Networks for NLP, Nov. 1, 2018, pp. 353-355.
Yang, et al., "Beyond 512 tokens: Siamese multi-depth transformer-based hierarchical encoder for document matching", In Repository of arXiv:2004.12297v2, Oct. 13, 2020, 10 Pages.
Yang, et al., "Hierarchical Attention Networks for Document Classification", In Proceedings of the 2016 Conference of the North American Chapter of the Association for Computational Linguistics: Human Language Technologies, Jun. 12, 2016, pp. 1480-1489.
Zhou, et al., "Multilevel text alignment with cross-document attention", In Proceedings of the Conference on Empirical Methods in Natural Language Processing, Nov. 2020, pp. 5012-5025.
"International Search Report & Written Opinion issued in PCT Application No. PCT/US22/029096", dated Aug. 22, 2022, 12 Pages.

* cited by examiner

Inter-sample

The objective of the game is to score as many goals as possible.
The objective of the game is to overcome as many obstacles as possible.

0.91 SBERT   0.62 SDR

Intra-sample

The objective of the game is to score as many goals as possible.
FIFA 20 is a soccer game developed by EA sports.

0.69 SBERT   0.83 SDR

*FIG. 13*

| Model | Inference | Video games | | | Movies | | | | Wines | | | |
|---|---|---|---|---|---|---|---|---|---|---|---|---|
| | | MPR | MRR | HR@10 | HR@100 | MPR | MRR | HR@10 | HR@100 | MPR | MRR | HR@10 | HR@100 |
| LDA | - | 94.1% | 36.8% | 8.8% | 28.1% | 93.1% | 36.2% | 7.7% | 16.2% | 83.7% | 29.4% | 8.3% | 41.5% |
| Longformer | CLS | 82.2% | 40.4% | 12.8% | 29.3% | 83.6% | 27.7% | 5.8% | 20.4% | 75.5% | 30.7% | 8.9% | 34.1% |
| Longformer | First | 87.3% | 41.8% | 11.1% | 31.5% | 83.9% | 27.7% | 6.8% | 21.3% | 75.2% | 27.2% | 9.0% | 35.2% |
| Longformer | ALL | 85.2% | 44.8% | 11.7% | 28.4% | 83.3% | 26.9% | 5.4% | 19.6% | 73.4% | 29.5% | 9.1% | 36.2% |
| Longformer | SDR$_{inf}$ | 90.5% | 48.5% | 15.2% | 36.2% | 87.8% | 32.3% | 8.8% | 23.4% | 79.1% | 36.1% | 18.0% | 42.3% |
| BERT | CLS | 83.3% | 42.1% | 13.9% | 30.6% | 85.7% | 29.5% | 5.4% | 21.2% | 76.1% | 30.5% | 9.2% | 35.7% |
| BERT | First | 83.8% | 42.5% | 14.3% | 30.9% | 85.9% | 29.4% | 5.8% | 21.8% | 75.9% | 30.7% | 10.0% | 36.1% |
| BERT | ALL | 82.9% | 41.5% | 13.4% | 30.0% | 85.2% | 29.2% | 5.1% | 19.5% | 76.1% | 30.1% | 8.3% | 35.4% |
| BERT | SDR$_{inf}$ | 84.5% | 49.3% | 19.2% | 31.2% | 86.1% | 31.9% | 6.1% | 23.1% | 77.1% | 32.9% | 10.5% | 41.0% |
| RoBERTa | CLS | 83.8% | 42.5% | 14.1% | 30.8% | 85.6% | 30.1% | 5.8% | 21.9% | 75.9% | 30.9% | 9.5% | 35.6% |
| RoBERTa | First | 84.7% | 43.1% | 14.9% | 31.2% | 86.1% | 29.8% | 6.1% | 22.1% | 74.9% | 31.1% | 10.5% | 36.4% |
| RoBERTa | ALL | 83.2% | 42.1% | 13.8% | 30.5% | 85.5% | 29.8% | 5.5% | 21.8% | 78.6% | 30.6% | 8.7% | 35.9% |
| RoBERTa | SDR$_{inf}$ | 84.9% | 47.7% | 19.8% | 37.5% | 86.5% | 32.2% | 6.7% | 23.7% | 78.1% | 31.4% | 10.9% | 38.8% |
| SBERT | First | 86.4% | 47.6% | 11.1% | 30.1% | 91.8% | 32.5% | 8.2% | 18.6% | 83.5% | 31.1% | 11.3% | 41.8% |
| SBERT | ALL | 92.6% | 51.1% | 16.3% | 37.2% | 93.2% | 32.9% | 9.7% | 22.1% | 81.3% | 28.3% | 11.6% | 37.4% |
| SBERTv | SDR$_{inf}$ | 91.3% | 50.9% | 16.5% | 34.3% | 92.5% | 30.9% | 8.8% | 23.5% | 80.1% | 31.7% | 10.1% | 39.2% |
| SBERT | SDR$_{inf}$ | 94.2% | 53.4% | 20.3% | 39.6% | 95.1% | 33.7% | 9.4% | 26.6% | 83.6% | 32.3% | 12.4% | 43.5% |
| SMITH | - | 92.8% | 54.6% | 21.3% | 41.8% | 95.2% | 34.2% | 12.1% | 28.5% | 81.5% | 38.1% | 14.3% | 45.9% |
| SDR | SDR$_{inf}$ | 97.4% | 58.1% | 22.3% | 44.7% | 98.1% | 38.7% | 13.4% | 30.4% | 89.3% | 40.9% | 17.2% | 49.2% |

|  | | Video games | | | | Movies | | | |
|---|---|---|---|---|---|---|---|---|---|
|  | | MPR | MRR | HR@10 | HR@100 | MPR | MRR | HR@10 | HR@100 |
| (i) | No hierarchical inference | 94.3% | 52.4% | 18.1% | 40.0% | 92.5% | 31.8% | 7.5% | 25.2% |
| (i) | Paragraph-level inference | 97.4% | 56.5% | 20.8% | 41.3% | 96.3% | 34.5% | 9.2% | 29.1% |
| (ii) | No training | 87.1% | 15.2% | 7.0% | 19.4% | 88.5% | 12.5% | 5.1% | 18.5% |
| (iii) | No normalization | 97.3% | 57.9% | 21.6% | 43.3% | 97.1% | 36.2% | 11.8% | 29.2% |
| (iv) | No contrastive loss | 91.5% | 30.0% | 14.5% | 32.4% | 92.5% | 29.1% | 8.4% | 18.3% |
| (v) | Standard cosine loss | 93.1% | 50.7% | 18.2% | 39.2% | 95.1% | 33.7% | 10.9% | 25.6% |
|  | Full method | 97.4% | 58.1% | 22.3% | 44.7% | 98.1% | 38.7% | 13.4% | 30.4% |

Quantitative Results

Video Games Documents

| Model | MPR | MRR | HR@100 | HR@10 |
|---|---|---|---|---|
| DCS | 97% | 63% | 54% | 22% |
| SBERT | 92% | 51% | 37% | 16% |
| LDA | 89% | 37% | 35% | 11% |
| BERT | 83% | 42% | 27% | 13% |
| ROBERTA | 83% | 34% | 24% | 12% |
| Longformer | 85% | 34% | 19% | 9% |

Wikipedia Movies Articles

| Model | MPR | MRR | HR@100 | HR@10 |
|---|---|---|---|---|
| DCS | 98% | 49% | 36% | 13% |
| SBERT | 93% | 31% | 20% | 10% |
| LDA | 93% | 31% | 16% | 8% |
| BERT | 85% | 24% | 18% | 6% |
| ROBERTA | 86% | 25% | 18% | 6% |
| Longformer | 84% | 23% | 16% | 6% |

Wikipedia Wines Documents

| Model | MPR | MRR | HR@100 | HR@10 |
|---|---|---|---|---|
| DCS | 89% | 51% | 59% | 17% |
| SBERT | 81% | 28% | 37% | 12% |
| LDA | 84% | 23% | 41% | 8% |
| BERT | 75% | 26% | 36% | 10% |
| ROBERTA | 75% | 26% | 36% | 11% |
| Longformer | 75% | 25% | 36% | 9% |

FIG. 16

SELF-SUPERVISED DOCUMENT-TO-DOCUMENT SIMILARITY SYSTEM

BACKGROUND

Text similarity comparison for ranking and/or scoring is an important task in multiple domains, such as information retrieval, recommendations, question answering, and more. Most methods for ranking documents are limited to relatively short documents or rely on the existence of "ground-truth" similarity labels associated with the documents. Yet, in most common real-world cases, similarity labels for every document in a corpus of documents are unavailable. Recent approaches based on Transformer language models, such as bidirectional encoder representations from transformers (BERT) models, benefit from effective text representations, but are limited in their maximum input text length. In other words, the language models are only effective for comparisons of relatively short documents. Therefore, currently available models are limited to short documents having labels, such as annotations. Hence, developing techniques for long-text or document level matching is an emerging research field. Thus, document comparison and ranking of documents in a collection by a language model is unavailable, inaccurate, or unreliable for documents of arbitrary length documents and/or documents lacking manually created similarity labels.

SUMMARY

Some examples provide a system for inferring document-to-document semantic similarities via a self-supervised language model. A data storage device includes a plurality of documents of variable length candidate documents. A self-supervised language model is pre-trained using sentence pairs produced by inter-and-intra document sampling from the plurality of documents. The sentence pairs include intra-sentence pairs obtained from a single document and inter-sentence pairs obtained from a pair of different documents in the plurality of documents. A two-staged hierarchical similarity matrix is created for the first candidate document based on the per-sentence embeddings representing each sentence in the candidate document. The two-staged hierarchical similarity matrix includes a sentence similarity matrix and a paragraph similarity matrix representing contents of the first candidate document. An inferred similarity score is calculated using the paragraph similarity matrix for the first candidate document. The score indicates a degree of semantic similarity between the first candidate document and the source document. The first candidate document has greater semantic similarity to the source document than a second candidate document within the plurality of documents if the inferred similarity score associated with the first candidate document is greater than the inferred similarity score associated with the second candidate document. The candidate documents can be ranked and/or recommendations generated based on the inferred similarity score for each candidate document in the plurality of documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 13 is an exemplary block diagram illustrating representative inter- and intra-samples, along with cosine similarity scores retrieved by SBERT and SDR.

FIG. 14 is an exemplary table illustrating similarity results evaluated on three datasets based on expert annotations.

FIG. 16 is an exemplary table 1600 illustrating document-to-document recommendations performance evaluated on three datasets.

Corresponding reference characters indicate corresponding parts throughout the drawings.

DETAILED DESCRIPTION

Figure 1:
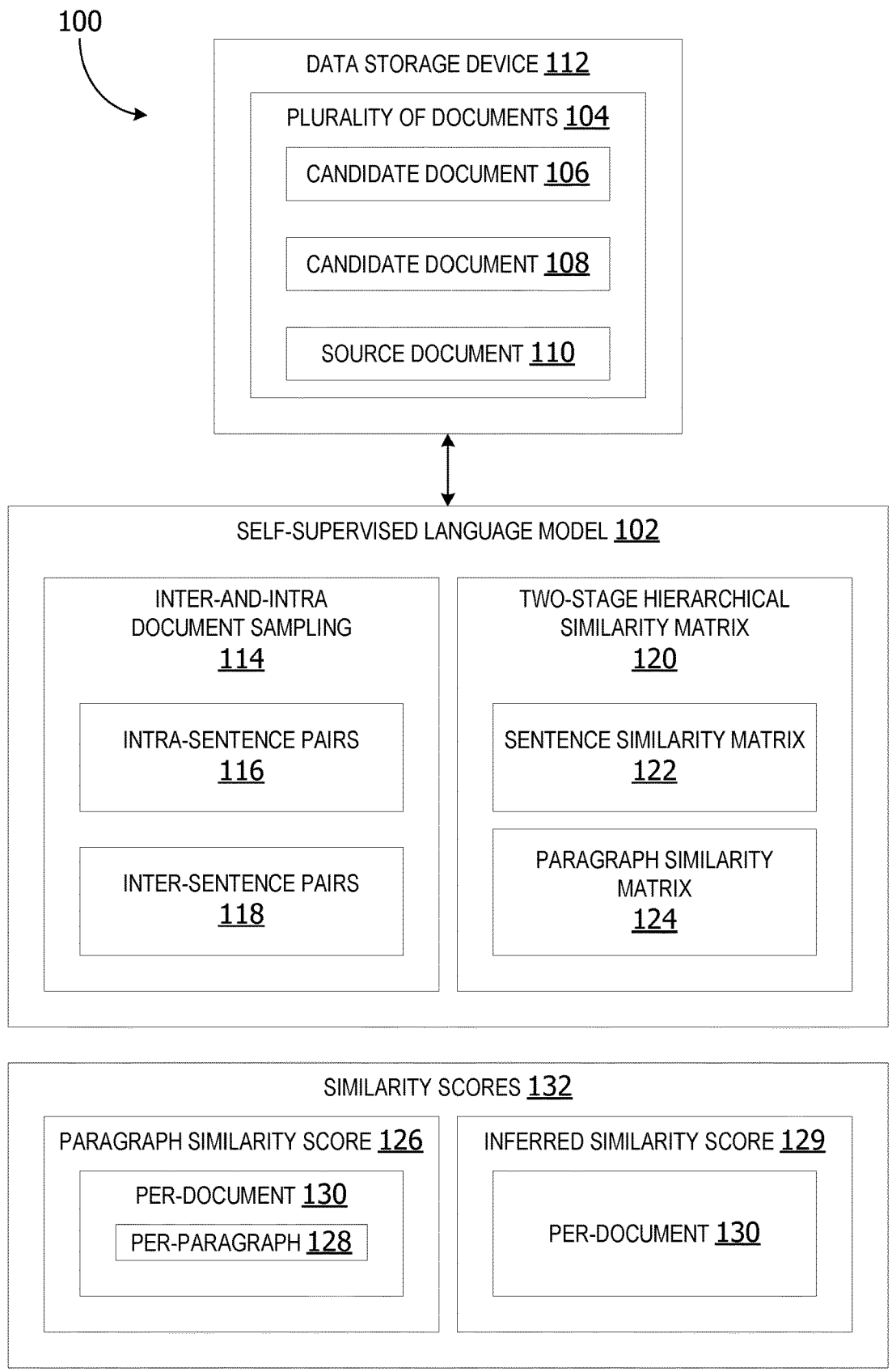
FIG. 1 is an exemplary block diagram illustrating a system for self-supervised document-to-document similarity scoring.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

Systems for scoring and ranking documents based on semantic similarity of the documents can be beneficial for use in content discovery. Similarity ranking/scoring can be useful across different platforms and applications, such as, but not limited to, recommendations systems. These systems can be applied on various domains, including music, movies, documents and more. Most contextual similarity ranking/scoring systems rely on collaborative filtering, a method that utilizes information extracted from historical activities of different users (sometimes called usage data). However, in some domains, where usage data is not available, also known as "cold domains", the ranking remains challenging, and requires extensive use of content understanding models. Systems that utilize content understanding are known as content-based systems, such as content-based recommendation systems. These content-based systems can employ various models, depending on the data at hand. However, these systems are typically limited to utilization with collections of documents that do not exceed a fixed, maximum length having similarity labels associated with each document, such as, but not limited to, citations and/or annotations. These limitations frequently make utilization of these systems impractical or undesirable due to normal variations in document length and lack of similarity labels in real-world applications.

Referring to the figures, examples of the disclosure enable a self-supervised document-to-document similarity scoring and/or ranking based on semantic similarity of variable length candidate documents to a source document. In some examples, the language model is pre-trained using sentence pairs produced by inter-and-intra document sampling from the plurality of documents. In these examples, intra-sentence pairs are obtained from a single document and inter-sentence pairs obtained from a pair of two different documents in the plurality of documents. The intra-document sentence pairs are assumed to have greater semantic similarity while the inter-document sentence pairs are assumed to have less semantic similarity. These sentence pairs are used during pre-training to improve text embeddings generated by the self-supervised language model for more accurate semantic similarity scoring of documents within the plurality of documents.

Aspects of the embodiments provide a self-supervised model for document-to-document similarity ranking of a collection of documents according to their semantic similarity to a source (query) document via contextualized language models and hierarchical inference. The model ranks a collection of documents according to their semantic similarity to the source document in cold domains, where usage data and historical user data is unavailable.

In other examples, the system calculates a two-staged hierarchical similarity matrix for each candidate document based on the per-sentence embeddings representing each sentence in the candidate document. The two-staged hierarchical similarity matrix includes a sentence similarity matrix and a paragraph similarity matrix representing contents of the first candidate document. The two-staged hierarchical similarity matrix is utilized to generate more accurate similarity scores for ranking candidate documents based on semantic similarity with the source document with improved accuracy and reliability in an absence of similarity labels and maximum document length limitations, conditions most likely to be experienced in real-world settings. This enables improved document scoring and ranking across broader ranges of documents and document types.

Other examples provide inferred similarity scoring of documents using a paragraph similarity matrix. The scores of all the documents in a given collection indicate each documents degree of similarity with the source document. This permits the system to more accurately and efficiently rank candidate documents in order from most relevant/most similar to least relevant/least similar relative to the source document. In this manner, the system is more widely applicable across a broader range of documents while presenting results that are more accurate, reliable, and cost effective than previous solutions.

Other aspects provide a self-supervised method for document-to-document similarity ranking (SDR) that can be effectively applied to extreme documents of arbitrary length without similarity labels. The model employing the document-to-document similarity process can effectively operate on long documents of arbitrary length in an absence of similarity labels for improved applicability of the similarity scoring and ranking.

Still other examples provide the self-supervised model for document-to-document similarity, supporting long documents of arbitrary lengths. Document similarities are extracted via a hierarchical bottom-up scoring procedure, which preserves more semantic information. It also provides machine learning for comparison of documents to identify similar documents, leading to superior similarity results.

The system operations in an unconventional manner by pretraining the model using intra-and-inter document sampling for improved ranking of documents in an absence of similarity labels and maximum document length limitations making this system operable on collections of documents which could not previously have been accurately scored or ranked. In this manner, the system is used in an unconventional way and allows greater applicability to a wider variety of documents for more accurate semantic similarity ranking with a reduced error rate for indexing, clustering, caching, linking to related documents, predicting whether a user is likely to click on a link, answering questions, making recommendations, and other applications.

FIG. 1 is an exemplary block diagram illustrating a system 100 for self-supervised document-to-document similarity scoring. A self-supervised language model 102 is a natural language processing (NLP) machine learning (ML) model for interpreting text-based similarities between documents and identifying semantic similarities between the documents. The self-supervised language model 102 is pre-trained to analyze documents of variable length in an absence of semantic similarity labels within the documents or otherwise associated with the documents. A similarity label is a label including data indicating similarities of one document with another. A label can include a human generated annotation, citation, index information, or other data which indicates whether the content of one document is likely to be related to another document.

The self-supervised language model 102, in some examples, is pre-trained to operate on a given collection of documents, such as, but not limited to, a plurality of documents 104. The plurality of documents 104 includes one or more candidate documents, such as, but not limited to, a candidate document 106 and/or a candidate document 108. The source document 110 is a document selected by a user. The source document 110 can also be referred to as a seed document or a query document.

The candidate documents within the plurality of documents can include documents within a same domain or different domains. The documents can include documents within the same domain but having different topics or themes. The documents in the plurality of documents 104 can also include documents having different (variable) lengths. There is no maximum length of the candidate documents.

Figure 17:
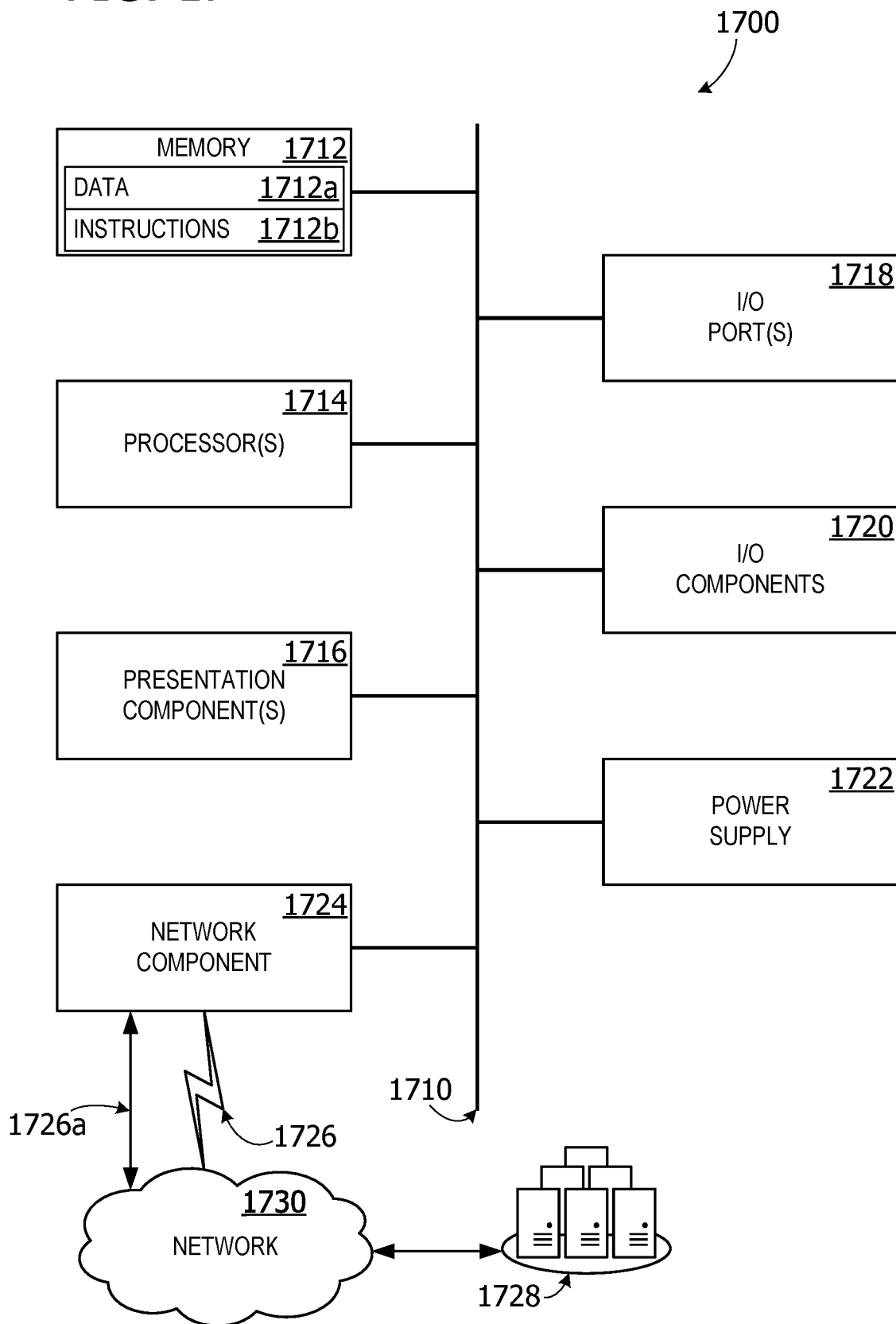
FIG. 17 is a block diagram of an example computing device for implementing aspects disclosed herein and is designated generally as computing device.

The self-supervised language model 102 is executed on one or more physical processor device and/or memory devices, such as, but not limited to, a processor and/or memory on the computing device 1700 in FIG. 17.

The candidate documents in this non-limiting example are stored in a data storage device 112. The data storage device 112 can be a physical data storage associated with a local computing device or a data storage device associated with a remote computing device, a data store in a data center, a data store associated with a cloud storage, a backup data store, or any other type of data storage. The data storage device may be incorporated within a physical computing device executing the self-supervised language model 102 or located externally to or remotely from the computing device.

The data storage device 112 can include one or more different types of data storage devices, such as, for example, one or more rotating disks drives, one or more solid state drives (SSDs), and/or any other type of data storage device. The data storage device 112 in some non-limiting examples includes a redundant array of independent disks (RAID) array. In other examples, the data storage device 112 includes a database.

In some examples, the self-supervised language model 102 is pretrained to specialize on the plurality of documents 104 using sentence pairs produced by inter-and-intra document sampling 114 from the plurality of documents 104. The sentence pairs include intra-sentence pairs 116 obtained from a single document. In this example, two sentences are taken from the same document, such as, but not limited to, the candidate document 106. The two sentences can be taken from the same paragraph or from different paragraphs within the same document.

The intra-and-inter document sampling 114 in other examples obtains inter-sentence pairs 118 from a pair of two different documents in the plurality of documents 104. The pair of two different documents can include the candidate document 106 and the candidate document 108. In this example, one sentence is randomly taken from the first candidate document 106 and another sentence is taken from the different candidate document 108.

The self-supervised language model 102 calculates a two-staged hierarchical similarity matrix 120 for a selected candidate document based on the per-sentence embeddings representing each sentence in the candidate document. The two-staged hierarchical similarity matrix 120 includes a sentence similarity matrix 122 representing the sentences in a single paragraph of the selected candidate document. A paragraph similarity score is generated based on the sentence similarity matrix 122 for a given paragraph. In other words, the paragraph similarity score 126 is a unique score generated on a per-paragraph 128 and per-document 130 basis. A paragraph similarity score is generated for each paragraph in each candidate document. Thus, if candidate document 106 includes three paragraph, three sentence similarity matrices and three paragraph similarity scores are generated for candidate document 106.

A paragraph similarity matrix 124 representing the contents of the first candidate document, including every paragraph within the document, is generated by aggregating all the sentence similarity scores for a given document. The inferred similarity score 129 is generated based on the normalized paragraph similarity matrix 124. Each candidate document receives one inferred similarity score for each source document. The inferred similarity score is a per-document 130 score. In other words, for a given source document 110, a total similarity score is calculated for each candidate document. If the plurality of documents 104 includes one-hundred documents, the self-supervised language model generates one-hundred inferred similarity scores 132 indicating a degree of similarity between each candidate document and the source document 110.

The documents can be ranked based on the similarity scores. For example, if the inferred similarity score 129 for the candidate document 106 indicates greater similarity with the source document 110 than the score for the candidate document 108, the candidate document 106 is given a higher rank and/or identified as being more relevant/similar to the source document. The document having the highest score, or highest rank is the document which is predicted to be most similar (has greatest semantic similarity) with the contents of the source document 110.

Figure 2:
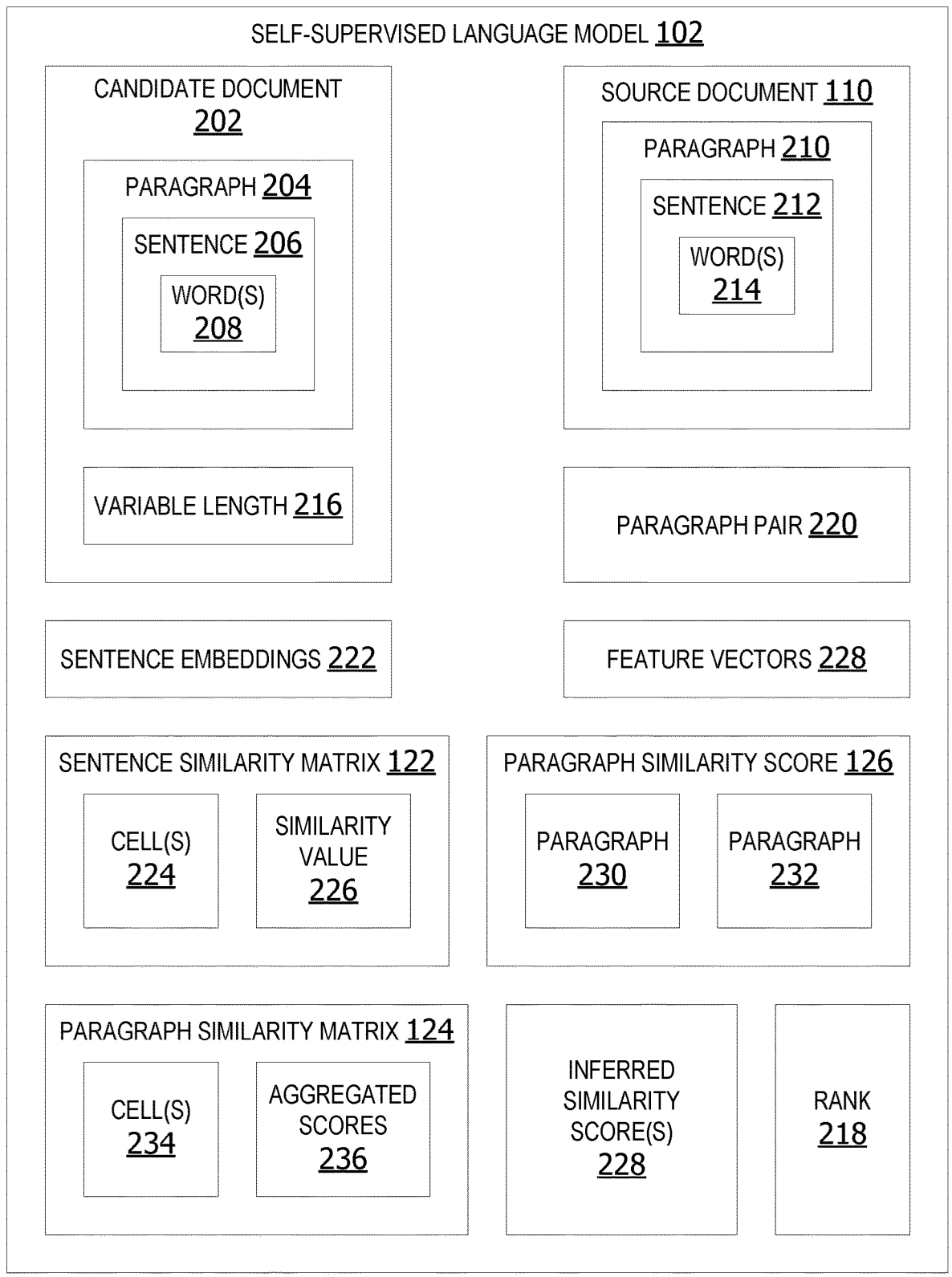
FIG. 2 is an exemplary block diagram illustrating a self-supervised language model for performing scoring and ranking variable length documents in accordance with semantic similarity to a source document.

FIG. 2 is an exemplary block diagram illustrating a self-supervised language model 102 for performing scoring and ranking of variable length 216 documents in accordance with semantic similarity to a source document 110. In some examples, a candidate document 202 is a variable length, text-based document having one or more paragraphs of text, such as, but not limited to, paragraph 204. Each paragraph includes one or more sentences, such as, but not limited to, sentence 206. A sentence includes one or more word(s) 208. In this example, the text is written in natural language. The candidate document 202 can optionally include pictures, illustrations, charts, graphs, tables, diagrams, equations, or other graphical information in additional to textual information.

The source document 110, in this non-limiting example, is a variable length document. The source document includes one or more paragraphs, such as, but not limited to, paragraph 210. Each paragraph includes one or more sentences, such as, but not limited to, sentence 212. Each sentence includes one or more words 214.

In some examples, the self-supervised language model 102 generates a rank 218 for each document in the plurality of documents in accordance with the degree of semantic similarity to the source document based on the inferred similarity scores 129 calculated for each document in the plurality of documents. In this example, at least one candidate document lacks similarity labels.

The documents can be ranked in ascending order from least similar to most similar. The documents can also be ranked in descending order from most semantically similar document to the least semantically similar candidate document. In some examples, the rank is assigned as a number, ordinal, position in a list, color ranking, percentage, or any other indicator for identifying a ranking of an item.

In other examples, the self-supervised language model 102 creates the sentence similarity matrix 122 for each paragraph pair 220 from the source document and the first candidate document based on sentence embeddings 222 associated with feature vectors 228 representing each sentence in a given paragraph. A paragraph pair 220 is a pair of two sentences in which one sentence is obtained from the source document and the other sentence is obtained from the selected candidate document. Each of the one or more cell(s) 224 in the sentence similarity matrix includes a similarity value 226 indicating a degree of similarity between a sentence from a paragraph in the source document and a sentence in a paragraph of the candidate document.

The self-supervised language model 102 calculates a paragraph-similarity score 126 for each paragraph in the first candidate document based on the sentence similarity matrix. The paragraph-similarity score 126 for a given paragraph indicates similarity between the given paragraph 230 in the candidate document and a corresponding paragraph 232 in the source document.

The self-supervised language model 102 aggregates a plurality of paragraph-similarity scores associated with the selected candidate document into a paragraph similarity matrix 124. Each of the one or more cell(s) 234 stores the aggregated paragraph similarity scores 236. In some examples, the system normalizes the paragraph similarity matrix 124 for each candidate document in the plurality of documents. The inferred similarity scores 229 for the plurality of documents are created based on the normalized paragraph similarity matrix for each candidate document in the plurality of documents.

Figure 3:
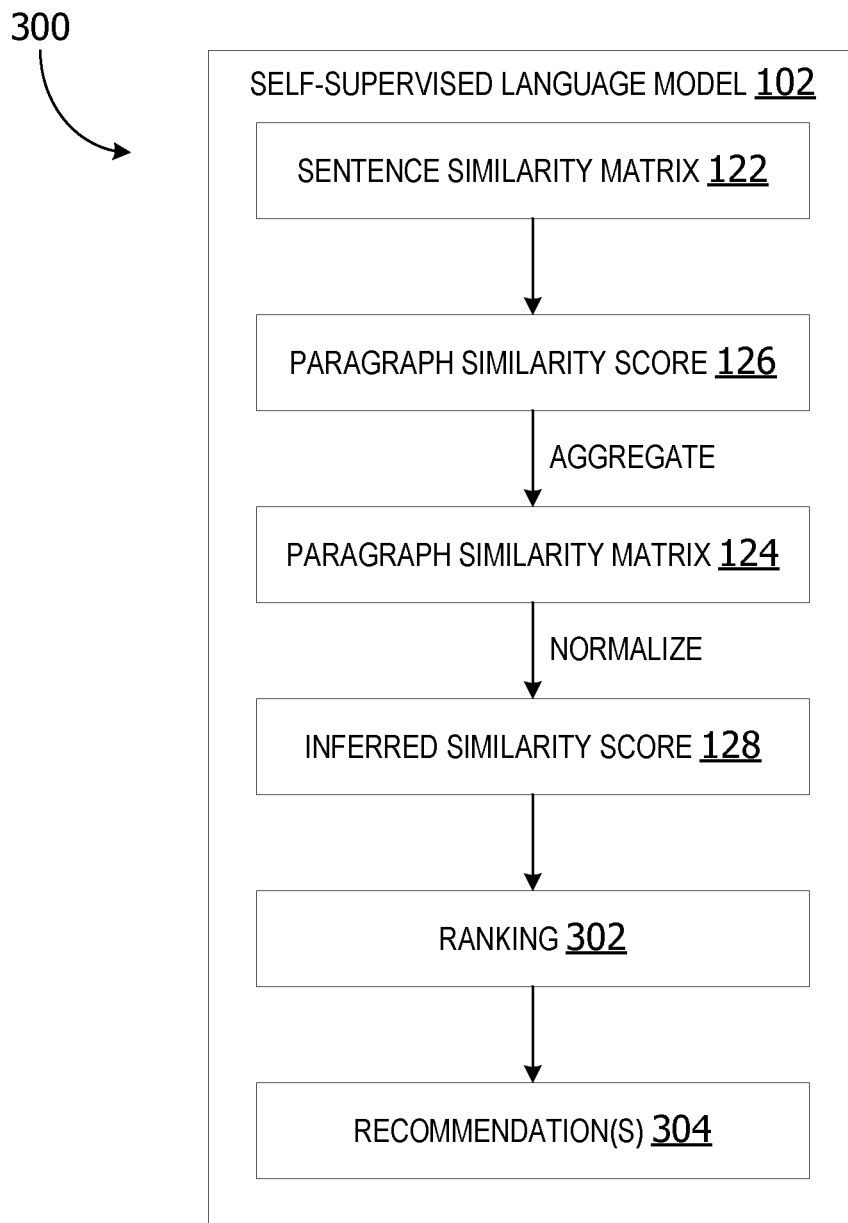
FIG. 3 is an exemplary block diagram illustrating a process for ranking variable length documents by a pre-trained self-supervised language model.

FIG. 3 is an exemplary block diagram illustrating a process 300 for ranking variable length documents by a pre-trained self-supervised language model. The ranking is performed 102 in accordance with semantic similarity to a source document in an absence of similarity labels and maximum document length limitations. In some examples, the system creates a sentence similarity matrix 122 representing a set of one or more sentences in a paragraph. Each cell in the sentence similarity matrix 122 includes a value representing the similarity of a sentence in the candidate document to one or more sentences in the source document. A paragraph similarity score 126 representing all the sentences in a given paragraph of the candidate document is generated based on the information within the sentences similarity matrix 122. The paragraph similarity scores for every paragraph in the candidate document are aggregated into a paragraph similarity matrix 124. Each cell in the paragraph similarity matrix includes a value representing the similarity of one paragraph in the candidate document with one or more paragraphs in the source document. An inferred similarity score 129 is generated based on a normalized paragraph similarity matrix. The inferred similarity scores for multiple documents are used for ranking the candidate documents. One or more recommendations 304 can be generated based on the ranking 302.

Figure 4:
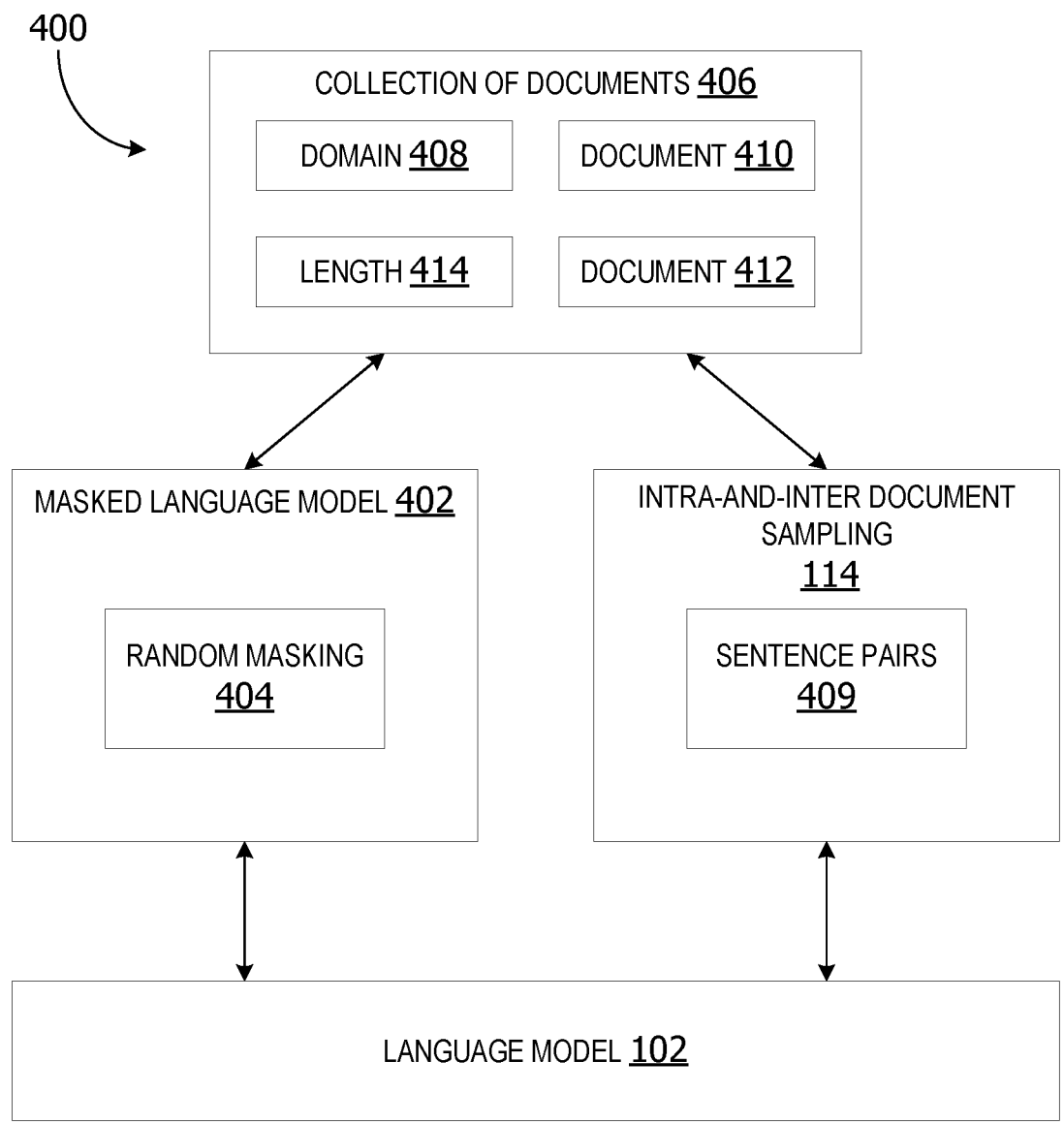
FIG. 4 is an exemplary block diagram illustrating a masked language model and intra-and-inter document sampling for pretraining a language model to perform scoring of candidate documents based on semantic similarity with a source document.

FIG. 4 is an exemplary block diagram illustrating a masked language model 402 and intra-and-inter document sampling 114 for pretraining 400 a language model 102 to perform scoring of candidate documents based on semantic similarity with a source document. In some examples, the masked language model 402 applies random masking 404 to portions of a document. The language model 102 attempts to reconstruct the masked portions. Feedback from the masked language model 402 fine-tunes contextual word embeddings generated by the language model 102 to specialize in a given domain 408 associated with a collection of documents 406 during a pre-training phase. The collection of documents 406 is a plurality of two or more documents, such as, but not limited to, the plurality of documents 104 in FIG. 1.

In parallel, the intra-and-inter document sampling 114 retrieves sentence pairs 409 from documents in the collection of documents 406 for use in training. The intra-sentence pairs are pairs of sentences obtained from a single document, such as, but not limited to, document 410. The inter-sentence pairs are pairs of sentences obtained from two documents, such as, but not limited to, document 410 and 412. In this example, one sentence in the pair is taken from document 410 and the second sentence in the sentence pair is taken from document 412. The documents in the collection of documents 406 are variable length 414 documents. The documents in this non-limiting example, do not include similarity labels.

Figure 5:
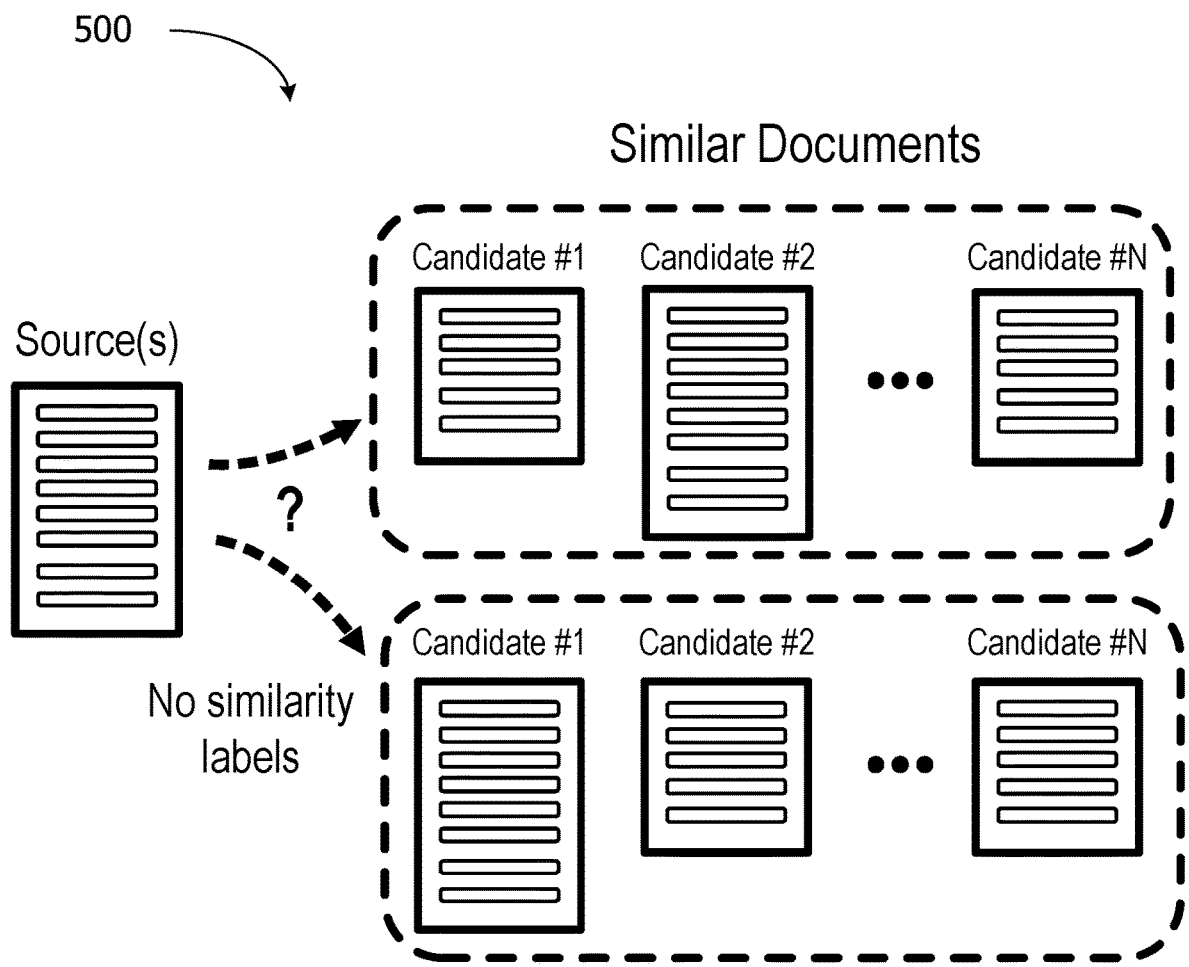
FIG. 5 is an exemplary block diagram illustrating ranking a collection of documents according to their semantic similarity to a source.

FIG. 5 is an exemplary block diagram illustrating ranking a collection of documents 500 according to their semantic similarity to a source. In this non-limiting example, the system is performing semantic similarity prediction for one or more source(s) 502. The source(s) 502 includes one or more source documents selected by one or more users.

The candidate documents include pages of text, including a sequence of sections. Each section can incorporate multiple paragraphs. Different sections of each document can be associated with different topics. A topic can include a subject, theme, field of study, subfield, frequently asked questions, instructional information, support, educational information, etc. The system propagates each candidate document through the model to score and/or rank each document. In this example, similar documents are placed into a first tier 506 while less similar or unsimilar documents are placed into a second tier (subgroup).

The system recommends similar documents from a given collection based on the scores/ranking of each document. This process is performed without usage data, such as in a user history or user profile. The documents are scored and ranked regardless of the presence or absence of similarity labels. In this example, recommendations are made from the first tier 504 including the subgroup of documents having the highest ranking.

Given a collection of documents "D" and a source document "s", the goal is to quantify a score that permits the model to rank all the other documents in "D" according to their semantic similarity with the source document "s". The system assumes the documents are not supplied with labels. The system also assumes historical usage data is unavailable.

Figure 6:
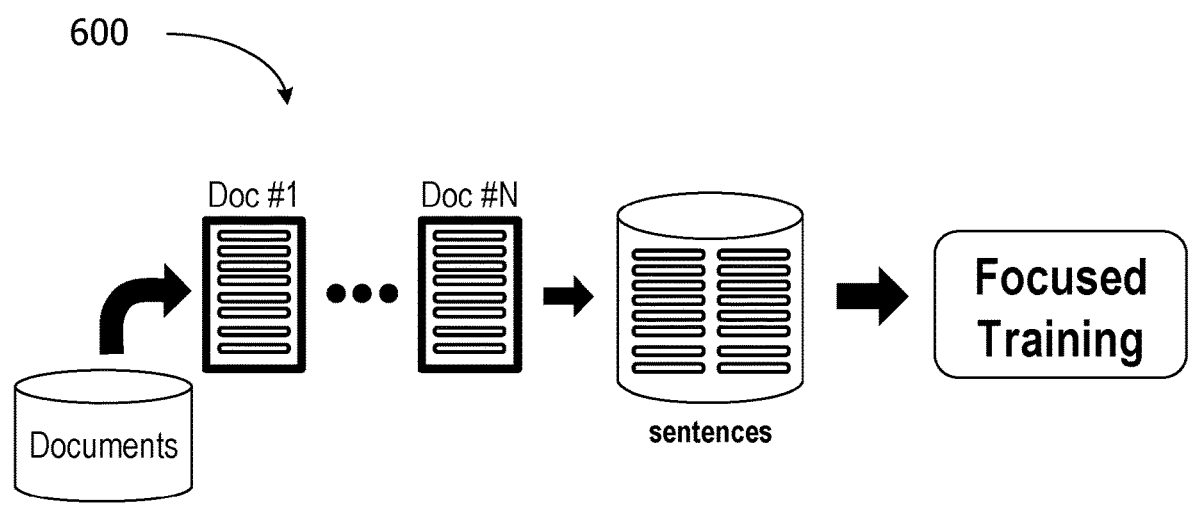
FIG. 6 is an exemplary block diagram illustrating pre-training of the language model.

FIG. 6 is an exemplary block diagram illustrating pre-training 600 of the language model. In this example, candidate documents 602 includes one or more documents, such as, candidate document 604 and/or candidate document 606. Each document is broken down into separate paragraphs and separate sentences 608 for focused training 610 on the sentences. The language model is trained on the corpus of documents 602 to fine-tune the model for identifying similarities between the documents and a source document.

Figure 7:
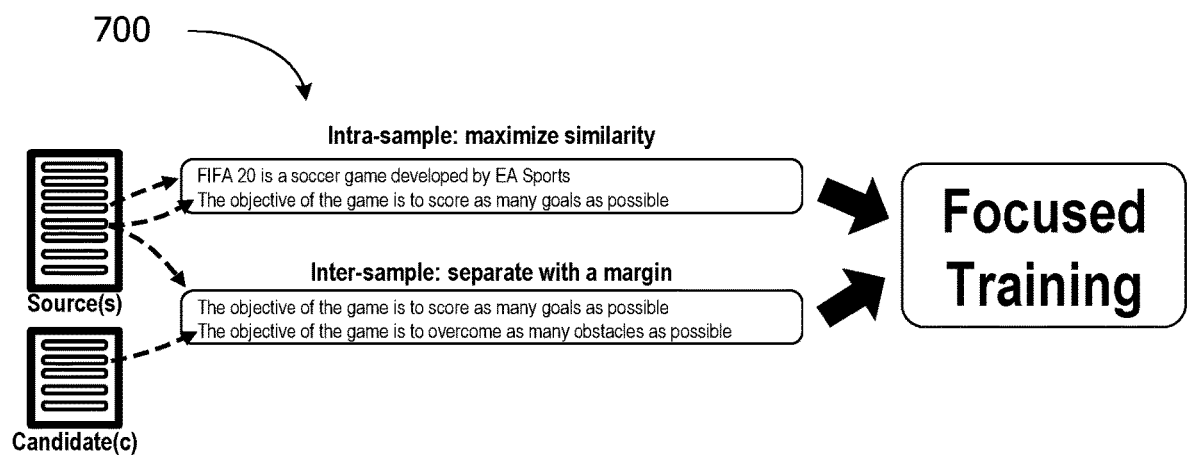
FIG. 7 is an exemplary block diagram illustrating application of self-supervision to mitigate the lack of labels.

FIG. 7 is an exemplary block diagram illustrating pre-training 700 of the language model. In this non-limiting example, SDR training is initialized with Bing's Turing NLR 3 backbone and performs focused-training on C1 data. DCS employs a self-supervised training that leverages: (1) a masked language model to specialize in a given domain. (2) a novel contrastive loss on sentence pairs, assembled by inter- and intra-sampling, to produce enhanced text embeddings for similarity.

In this example, the system adopts the RoBERTa language model as a backbone and continues the training of the RoBERTa model on the collection of documents. Unlike RoBERTa, the SDR training solely relies on negative and positive sentence pairs produced by inter- and intra-document sampling, respectively. Specifically, the SDR training propagates sentence pairs sampled from the collection of documents. The sentence pairs are sampled from the same paragraph with probability 0.5 (intra-samples), otherwise from different paragraphs taken from the different documents (inter-samples).

The sentences in each pair are then tokenized, aggregated into batches, and randomly masked in a similar way to the RoBERTa pre-training paradigm. The SDR objective comprises a dual-term loss. The first term is a masked language model (MLM) adopted from BERT. The MLM loss allows the model to specialize in the given collection of documents. The second loss term is the contrastive loss. Given a sentence pair (p; q) propagated through the model, the system computes a feature vector for each sentence by average pooling the token embeddings associated with each sentence separately. The token embeddings are the output of the last encoder layer of the model. The contrastive loss is then applied to the pair of feature vectors and aims to encourage the representations of intra-samples to become closer to each other while pushing inter-samples further away than a predefined positive margin "m".

As the inter-samples represent sentences that were randomly sampled from different documents, it is not guaranteed that their semantics would oppose each other. Instead, it is likely that those sentences are semantically uncorrelated while obtaining some level of opposite semantics only in rare cases. Therefore, instead of pushing negative samples to completely opposite directions, contrastive loss is leveraged in a way that encourages orthogonality between inter-samples while avoiding penalizing samples with negative scores.

In some examples, the margin "m" is set to a value of one, which encourages inter-samples to have a cosine similarity that is less than or equal to 0. The system does not penalize pairs with negative cosine scores. Both loss terms are combined together by equal weighting.

The system, in other examples, employs a self-supervised training that leverages a masked language model to specialize in a given domain. A contrastive loss is performed using sentence pairs, assembled by inter- and intra-sampling, to produce enhanced text embeddings for similarity determination. The source(s) 702 and the candidate(s) 704 are analyzed to identify text-based similarities between the documents.

Figure 8:
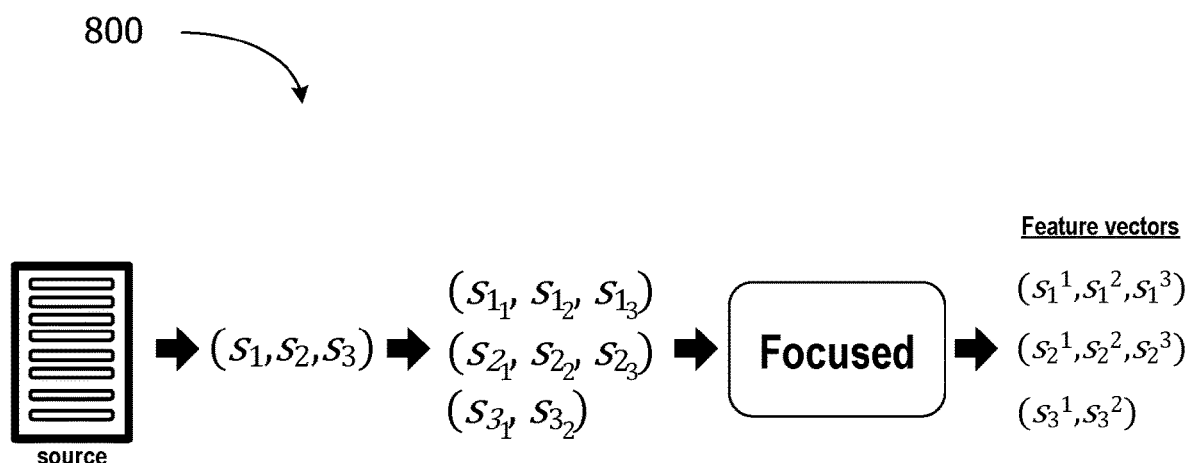
FIG. 8 is an exemplary block diagram illustrating mapping each document to a sequence of feature vectors.

FIG. 8 is an exemplary block diagram illustrating mapping each document to a sequence of feature vectors 800. Each document is propagated separately through the self-supervised language model. The model separates out the sentences and then converts the sequence of sentences into a sequence of feature vectors.

Figure 9:
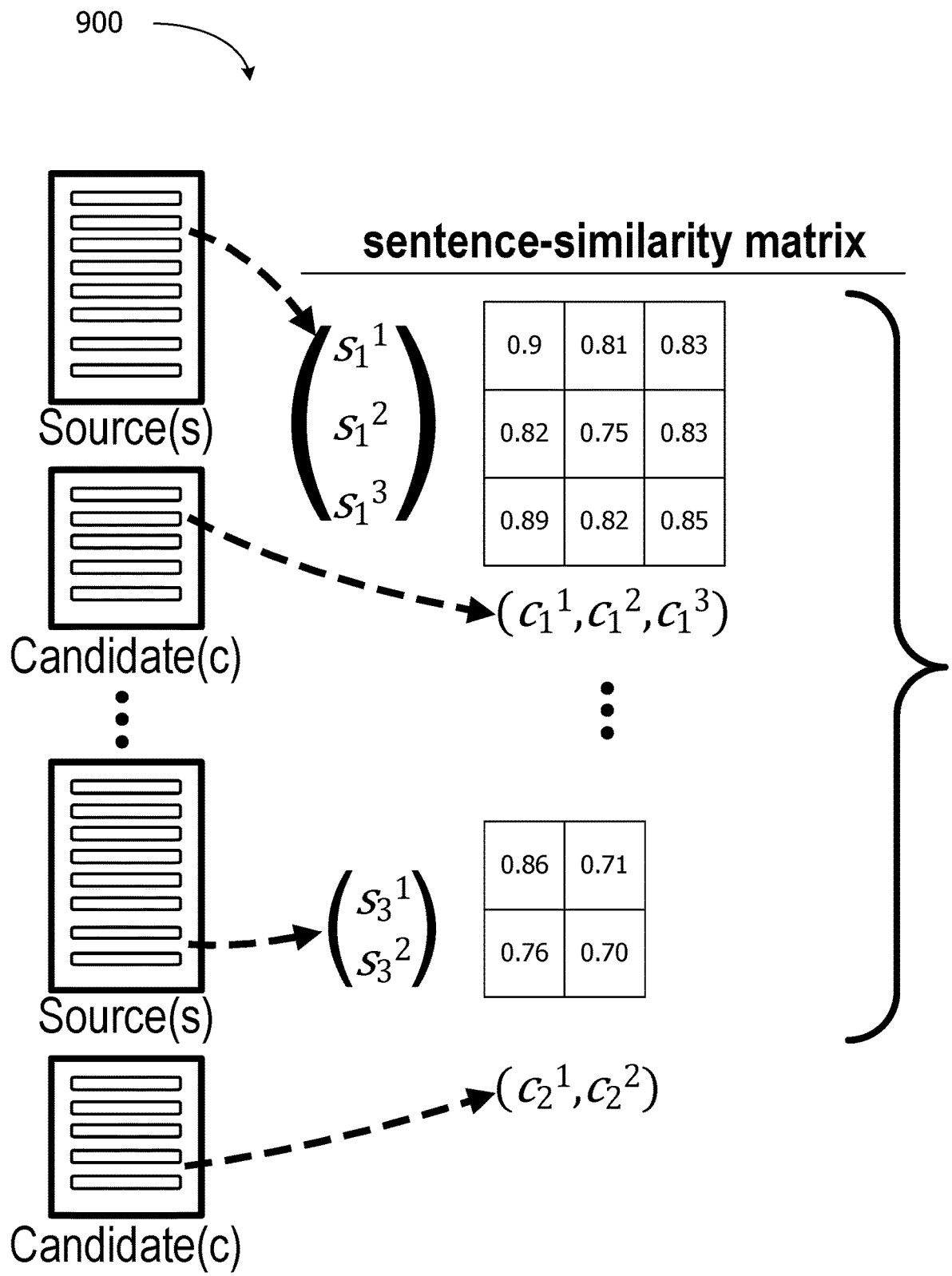
FIG. 9 is an exemplary block diagram illustrating generation of sentence similarity matrix.

FIG. 9 is an exemplary block diagram illustrating generation of sentence similarity matrix 900. The model produces per-sentence embeddings followed by a two-staged hierarchical scoring process. In this example, the source document "s" is composed of a sequence of paragraphs where each paragraph comprises a sequence of sentences. The self-supervised language model 102 scores the similarity between the source document and the candidate document "c" by calculating a two-staged hierarchical similarity matrix and two-staged hierarchical scores for each candidate document.

The first stage operates on sentences to score the similarity between paragraph-pairs, and the second operates on paragraphs to infer the similarity between two documents. The system maps each document in collection of documents into a sequence of vectors by propagating its sentences through the model. Each sentence is then transformed into a vector by average pooling the token embeddings of the last encoder layers' outputs.

For each candidate document, the model iterates over the feature vectors associated with the sentences in the source document and the candidate document to compose a sentence similarity matrix for each paragraph-pair from both documents. Specifically, for each paragraph-pair, the self-supervised language model computes the cosine similarity between every pair of sentence embedding, forming a sentence-similarity matrix. The paragraph-similarity scores are then aggregated into a paragraph-similarity matrix, as shown in FIG. 10, below.

Figure 10:
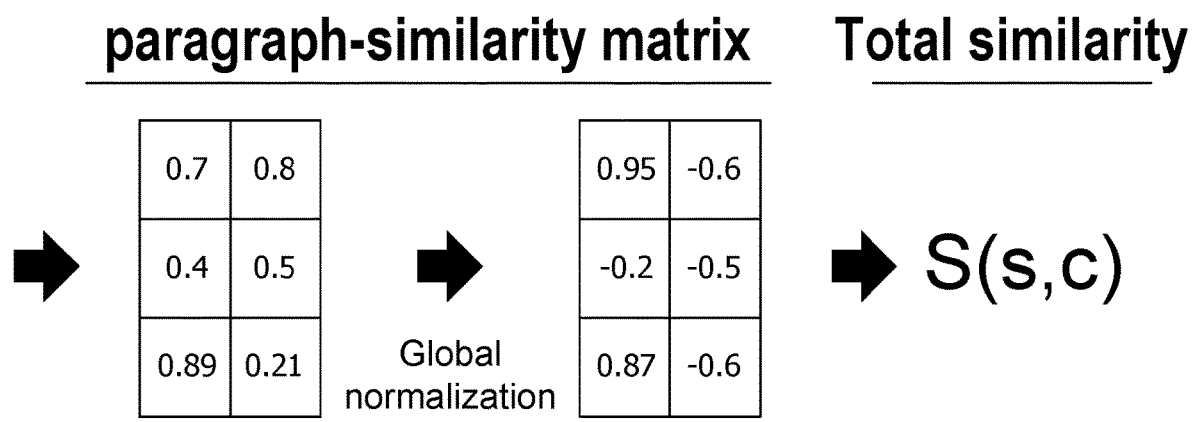
FIG. 10 is an exemplary block diagram illustrating generation of paragraph similarity matrix and a total similarity score.

FIG. 10 is an exemplary block diagram illustrating generation of paragraph similarity matrix 1000 and a total similarity score. Similar paragraph-pairs should incorporate similar sentences that are more likely to correlate under the cosine metric, due to the properties of the contrastive loss employed throughout SDR training of the self-supervised language model. In order to rank all the documents in the dataset, the model computes the above paragraph-similarity matrix for every candidate document. The resulted paragraph-similarity matrices are then globally normalized, using a standard z-score normalization, across all similarity metrices.

The motivation behind this global normalization is to refine the similarity scores by highlighting the ones of the most similar paragraph-pairs and negatively scores the rest. Different paragraph-pairs incorporate sentences with different distributions of cosine scores, where some source paragraphs may yield a distribution of cosine values with a sizeable margin compared to other paragraphs. This can be attributed to the embedding space, for which some regions can be denser than others. Finally, a total similarity score is inferred for each candidate c, using the above paragraph similarity matrix. The total similarity score aims to quantify the cumulative similarity between s and c. To this end, the model aggregates all paragraph-similarity scores for each paragraph in the source document by matching between the most similar paragraphs from the source document and the candidate document, letting those most correlated paragraph-pairs contribute to a total similarity score between both documents. Finally, the ranking of the entire collection of documents can be obtained by sorting all candidate documents according to their total similarity, in a descending order.

Documents-pairs, comprising the source document and the selected candidate document, are not propagated through the language model (which is computationally exhaustive). Instead, the documents are separately propagated through the model. Then, the scoring solely requires applications of non-parametric operations. (2) both SDR training and inference operate on sentences and therefore do not suffer from discrepancies between the two phases.

In some examples, the self-supervised language model adopts the RoBERTa language model as a backbone and continues the training of the RoBERTa model on the collection of documents "D". Unlike RoBERTa, the self-supervised language model training solely relies on negative and positive sentence pairs produced by inter- and intra-document sampling, respectively. Specifically, the self-supervised language model training propagates sentence pairs sampled from the collection of documents. The sentence pairs are sampled from the same paragraph with probability 0.5 (intra-samples), otherwise from different paragraphs taken from the different documents (inter-samples). The sentences in each pair are then tokenized, aggregated into batches, and randomly masked in a similar way to the RoBERTa pre-training paradigm. The SDR objective comprises a dual-term loss.

The first loss term is a standard MLM. The MLM loss allows the model to specialize in the given collection of documents. The second loss term is the contrastive loss.

Given a sentence pair (p, q) propagated through the model, the self-supervised language model computes a feature vector for each sentence by average pooling the token embeddings associated with each sentence separately. The tokens embedding are the output of the last encoder layer of the model. The contrastive loss is then applied to the pair of feature vectors and aims to encourage the representations of intra-samples to become closer to each other while pushing inter-samples further away than a predefined positive margin $m \in R+$. Formally, the contrastive loss is defined as follows:

$$L_C = \begin{cases} 1 - C(fp, fq) & y_{p,q} = 0 \\ \max(0, C(fp, fq) - (1 - m)) & y_{p,q} = 0 \end{cases}$$

where fp, fq are the pooled vectors extracted from the tokens embedding of sentence p and q, respectively. The term y(p, q)=1 indicates an intra-sample (sentence-pair sampled from the same paragraph), otherwise negative (sentence-pair from different documents). The term C(fp, fq) measures the angular distance between fp and fq using the Cosine function:

$$C(fp, fq) = \frac{f_p^T f_q}{|fp||fq|}$$

The self-supervised language model, in some examples, scores sentences in a way that is more faithful to their underlying topic and semantics. Importantly, as the inter-samples represent sentences that were randomly sampled from different documents, it is not guaranteed that their semantics would oppose each other. Instead, it is likely that those sentences are semantically uncorrelated while obtaining some level of opposite semantics only in rare cases. Therefore, instead of pushing negative samples to completely opposite directions, the system leverages the contrastive loss in a way that encourages orthogonality between inter-samples while avoiding penalizing samples with negative scores. Hence, the system encourages inter-samples to have a cosine similarity that is less than or equal to 0 and does not penalize pairs with negative cosine scores. Finally, both loss terms are combined together yielding the total loss:

$$L_{TOTAL} = L_{MLM} + L_C$$

Let $s \in D$ be a source document composed of a sequence of paragraphs s=(si) n i=1, where each paragraph comprises a sequence of sentences si=(s k i) i*k=1. Similarly, let $c \in D$ be a candidate document, c can be written as c=(cj) m j=1, where cj=(c r j) j*r=1. The SDR inference scores the similarity between s and every other candidate document c by calculating two-staged hierarchical similarity scores. The first stage operates on sentences to score the similarity between paragraph-pairs, and the second operates on paragraphs to infer the similarity between two documents. The system first maps each document in the collection of documents into a sequence of vectors by propagating its sentences through the model. Each sentence is then transformed into a vector by average pooling the token embeddings of the last encoder layers' outputs. Next, for each candidate document $c \in D$, the self-supervised language model iterates over the feature vectors associated with the sentences in s and c and composes a sentence similarity matrix for each paragraph-pair from both documents. Specifically, for each paragraph-pair (si, cj) $\in s \times c$, SDR computes the cosine similarity between every pair of sentence embedding from si×cj, forming a sentence-similarity matrix. Focusing on the (k, r) cell of this matrix, $1 \leq k \leq i^*$, $1 \leq r \leq j^*$, the sentence-similarity matrix can be expressed as:

$$M_{ij}^{kr} \triangleq C(C_i^k C_j^r)$$

Calculated for each paragraph pair (si, cj)$\in s \times c$, the paragraph-similarity scores are then aggregated into a paragraph-similarity matrix. Focusing on the (i, j) cell, the matrix can be expressed as:

$$P_{ij}^{sc} \triangleq \frac{\sum_{k=1}^{i*} \max_{0 \leq r \leq j} * M_{ij}^{kr}}{i*}$$

Figure 11:
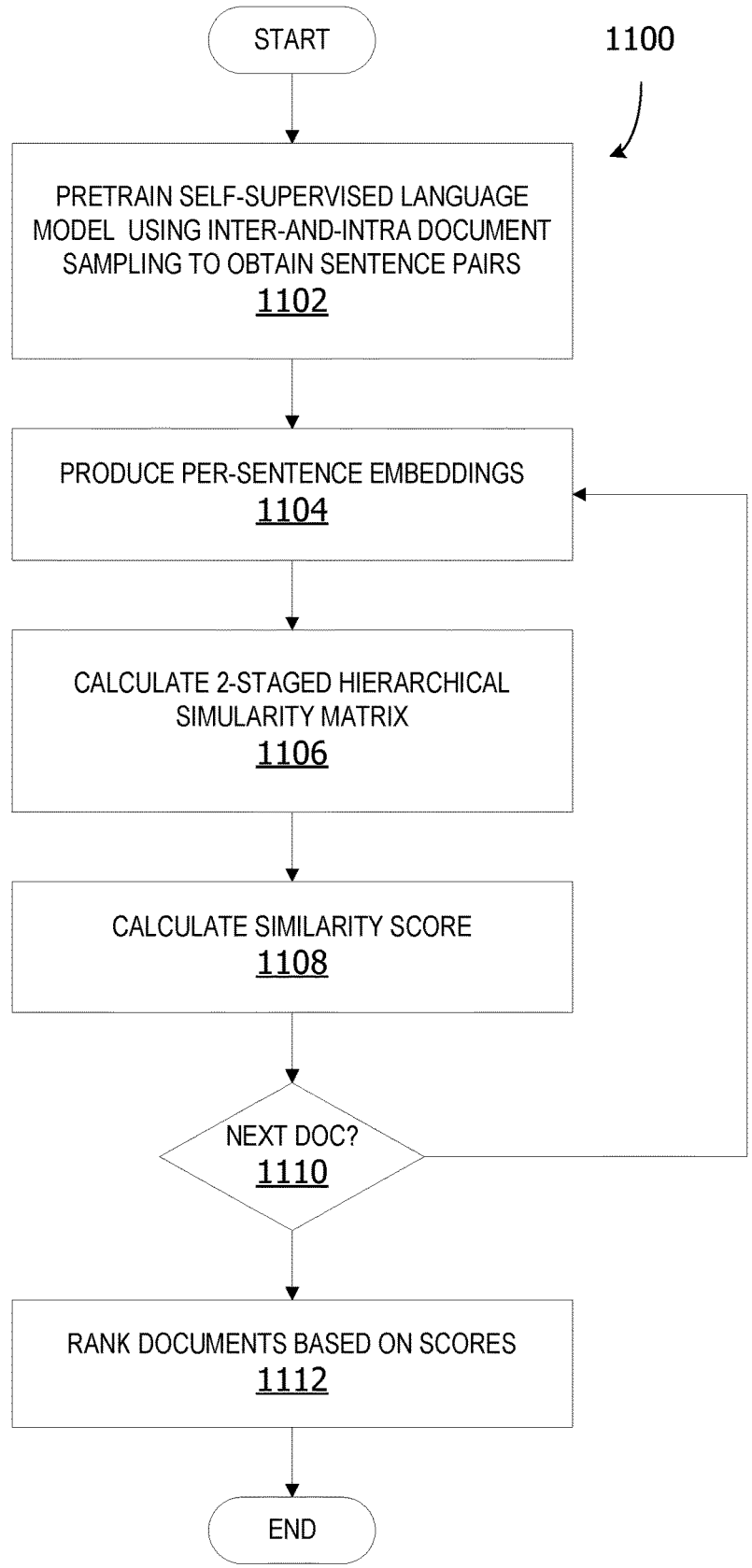
FIG. 11 is an exemplary flow chart illustrating operation of a computing device to rank documents based on similarity.

The motivation behind the similarity scores in the equation above is that similar paragraph-pairs should incorporate similar sentences that are more likely to correlate under the cosine metric, due to the properties of the contrastive loss employed throughout SDR training. In order to rank all the documents in the dataset, the system computes the above paragraph-similarity matrix for every candidate document $c \in D$. The resulted paragraph-similarity matrices are then globally normalized. Each row i in $P_{ij}^{sc}$ is z-score normalized by a mean and standard deviation computed from the row i values of $P_{ij}^{sc}$ across all candidates $c \in D$. The motivation behind this global normalization is to refine the similarity scores by highlighting the ones of the most similar paragraph-pairs and negatively scores the rest. Different paragraph-pairs incorporate sentences with different distributions of cosine scores, where some source paragraphs may yield a distribution of cosine values with a sizeable margin compared to other paragraphs. This can be attributed to the embedding space, for which some regions can be denser than others. Finally, a total similarity score is inferred for each candidate c, using the above paragraph similarity matrix. The total similarity score aims to quantify the cumulative similarity between s and c. To this end, all paragraph-similarity scores for each paragraph in the source document are aggregated as follows:

$$S(s, c) = \frac{\sum_{i=1}^{N} \sum_{1 \leq j \leq m}^{max} [NRM(M_p(s, c))]_{ij}}{n}$$

where NRM is the global normalization explained above. The essence of the above equation is to match between the most similar paragraphs from s and c, letting those most correlated paragraph-pairs contribute to the total similarity score between both documents. Finally, the ranking of the entire collection d can be obtained by sorting all candidate documents according to S(s, c), in a descending order. It is important to notice that (1) in SDR inference, documents-pairs are not propagated through the language model (which is computationally exhaustive). Instead, the documents are separately propagated through the model. Then, the scoring solely requires applications of non-parametric operations. In some examples, both SDR training and inference operate on sentences and therefore do not suffer from discrepancies between the two phases FIG. 11 is an exemplary flow chart 1100 illustrating operation of a computing device to rank documents based on similarity. The process shown in FIG. 11 is performed by a self-supervised language model, executing on a computing device, such as the computing device 1700 in FIG. 17.

The process begins by pre-training a self-supervised language model using inter-and-intra document sampling to obtain sentence pairs at 1102. Per-sentence embeddings are produced at 1104. A two-staged hierarchical similarity matrix is calculated at 1106. A similarity score is calculated at 1108. A determination is made whether a next document is available at 1110. If yes, the process returns to 1104 and iteratively performs operations 1104 through 1110 until a similarity score is calculated for all the candidate documents at 1110. The documents are ranked based on the similarity scores at 1112. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
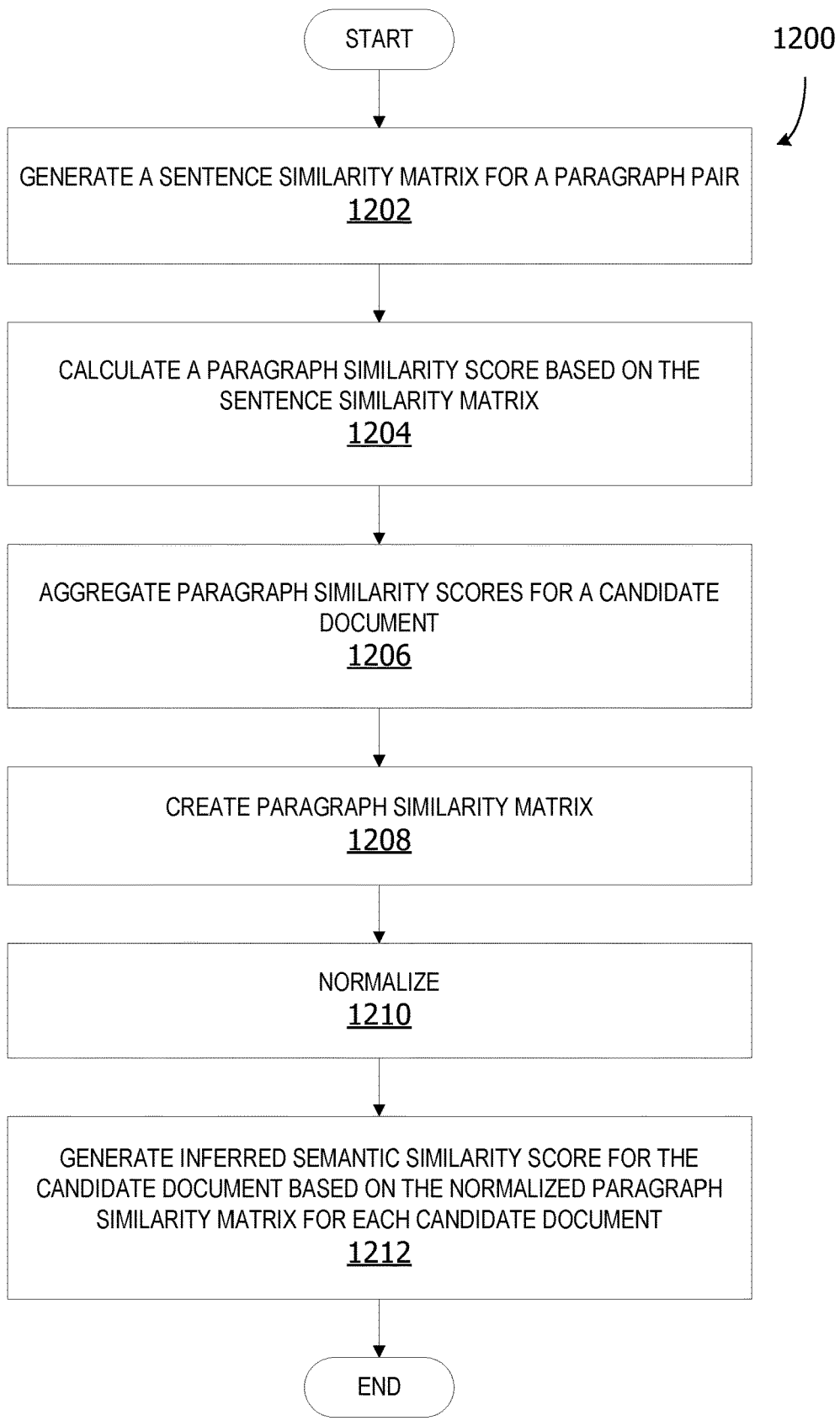
FIG. 12 is an exemplary flow chart illustrating operation of a computing device to generate an inferred similarity score.

FIG. 12 is an exemplary flow chart 1200 illustrating operation of a computing device to generate an inferred similarity score. The process shown in FIG. 12 is performed by a self-supervised language model, executing on a computing device, such as the computing device 1700 in FIG. 17.

The process begins by generating a sentence similarity matrix for a paragraph pair at 1202. A paragraph similarity score is calculated based on the sentence similarity matrix at 1204. The paragraph similarity scores for all the paragraphs in the documents are aggregated at 1206. A paragraph similarity matrix is created at 1208. The paragraph similarity matrix is normalized at 1210. The inferred similarity score for the candidate document is generated based on the normalized paragraph similarity matrix for each candidate document at 1212. The process is terminated thereafter.

While the operations illustrated in FIG. 12 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 12.

FIG. 13 is an exemplary block diagram illustrating representative inter- and intra-samples 1300, along with cosine similarity scores retrieved by SBERT and SDR. Inter-sampling from two documents associated with games of different categories are shown at 1302. SBERT scores the sentences with a higher cosine value than the one retrieved by SDR. At 1304, attaching the anchor sentence with a sentence sampled from the same paragraph (and document). SDR and SBERT are reversed, where SDR yields a higher score that is more faithful to the sentences' underlying semantics and topic.

FIG. 14 is an exemplary table 1400 illustrating similarity results evaluated on three datasets based on expert annotations. In this example, three manually-labeled test-sets are assembled using expert annotations for evaluating long-document similarities. The self-supervised language model, referred to as SDR, is evaluated on three datasets with human-annotated test set of similarity labels. The video games dataset consists of 21,935 articles reviewing video games from all genres and consoles. Each article consists of a different combination of sections, such as summary, gameplay, plot, production, etc. The movies dataset consists of 100385 articles describing different movies. The movies' articles incorporate paragraphs describing the plot, cast, production, reception, soundtrack, and more. For this dataset, a test set of ground truth annotations for 50 source articles is provided. Each source article is associated with a list of ~12 most similar movies.

In another example, the wines dataset consists of 1635 articles from the wine domain. This dataset consists of a mixture of articles discussing different types of wine categories, brands, wineries, grape varieties, and more. The ground-truth similarities were crafted by a human sommelier who annotated 92 source articles with ~10 similar articles, per source.

The performance of the models is evaluated by utilizing mean percentile rank (MPR) and mean reciprocal rank (MRR) metrics. The mean percentile rank is the average of the percentile ranks for every sample with ground truth similarities in the dataset. Given a sample "s", the percentile rank for a true recommendation r is the rank the model gave to "r" divided by the number of samples in the dataset. MPR evaluates the stability of the model, i.e., only models where all ground truth similarities had a high rank by the model will have a good score.

The mean reciprocal rank is the average of the best reciprocal ranks for every sample with ground truth similarities in the dataset. Given a sample with ground truth similarities, the rank of each ground truth recommendation by the model is marked. The reciprocal of the best (lowest) rank is taken.

The hit ratio at k (HR@k) HR@k evaluates the percentage of true predictions in the top "k" retrievals made by the model, where a true prediction corresponds a candidate sample from the ground truth annotations. In baseline models, the self-supervised language model is compared with baselines for topic modeling and text-matching. LDA assumes documents can be described by a distribution of latent "topics", where each topic can be described by a distribution over the words in the vocabulary. For every LDA experiment, a grid search is performed with 1000 different configuration of hyperparameters. The reported performance corresponds to the model with the highest topic coherence value (Newman et al., 2010).

BERT, RoBERTa and Longformer models are evaluated using two different variants. The first utilizes the publicly available pre-trained weights of the models. The second continues the pre-training of the models on the evaluated datasets, applying the proposed method associated with each model. The motivation for continue pre-training the baselines is to make they are optimized for the given collection of documents. A "large" network architecture is used for all experiments. SBERT The SBERT model utilizes a pre-training approach that produces semantically meaningful embeddings under a cosine-similarity metric. Since SBERT does not propose a method for unlabeled datasets, the model is evaluated with (1) its original weights and (2) after fine-tuning with the pseudo labels.

SMASH and SMITH are two models designed for long-document embedding. They both apply document embedding and require similarity labels for fine-tuning. Different from SBERT, since SMASH and SMITH utilize models that operate on entire documents, they cannot be fine-tuned with SDR self-supervision.

Comparing SDR with the above baselines, which are restricted by a maximal sequence length, the performance of four different inference techniques applied on the output embeddings of the different models includes: (i) CLS—use the special CLS token embedding of the N5 first tokens. (ii)

FIRST—use the mean of the embeddings of the N first tokens. (iii) ALL—propagating the entire document in chunks, then use the mean of the embeddings of all the tokens in the sample. (iv) $SDR_{inf}$- use the hierarchical SDR inference.

The above table 1400 second column specifies the applied inference method. $SBERT_v$ refers to the vanilla SBERT (without continuing training on each dataset by utilizing our pseudo-labels). All differences between the self-supervised language model (SDR) and other alternatives are statistically significant (with $p<0.05$) are shown.

The results over the document similarity benchmarks are depicted in table 1400. The scores are based on the ground-truth expert annotations associated with each dataset. The results indicate that SDR outperforms all other models by a sizeable margin. Specifically, for the movies dataset, the gaps between SDR and the second-best baseline, SMITH, are up to 15%. Recall that the underlying LMs evaluated (BERT, RoBERTa, and Longformer) were pretrained on the MLM objective. This makes them hard to generate meaningful embeddings suitable for probing similarity using the Cosine-similarity metric.

Comparing to the best variant of each model, SDR presents absolute improvements of ~7-12% and ~11-13% in MPR, and MRR, respectively, and across all datasets. SBERT, as opposed to the underlying models above, presents a cosine similarity-based loss during training. Compared to SDR, a fine-tuned SBERT, which utilizes the pseudo-labels shows inferior results across all datasets, yielding −3% MPR, −5% MRR and −2% HR@10 in the Video games and larger margin on the Movies and wines datasets. This can be attributed to SBERT's cosine loss, that constantly penalizes negative pairs to reach a cosine score of ~1. For uncorrelated sentence pairs, such property can hinder the convergence of the model. See the below ablation analysis for more details. SBERT's suffers from an additional degradation in performance when applied with the original SBERT weights, yielding −6% MPR and −8% MRR. This can be attributed to the importance of continue training on the given dataset at hand. SMITH, which is the second-best model, yields degraded performance compared to SDR. Unlike SDR, SMITH generates a single embedding vector for the whole document. SMITH struggles to accurately embed documents with thousands of tokens. Furthermore, since SMITH operates in a supervised manner, SMITH cannot be fine-tuned without labels. These results correlate with $SBERT_v$ performance, emphasizing the importance of continuing the training on the dataset at hand. Notably, as shown in the table 1400, applying the SDR inference to other baseline language models improves their performance by a sizeable margin. This is another evidence of our inference's applicability, especially as sizeable gains across all baseline models and datasets are observed. Inspecting SBERT, the SDRinf gains increase in all metrics, yielding an increase of at least +3% MPR, +4% MRR, +6% HR@10 and +7% HR@100. This can be attributed to the importance of the hierarchical evaluation for long documents and indicate the struggle transformers have in embedding long text into a single vector. Importantly, SDR outperforms SBERT by a sizeable margin, even when SBERT is applied with SDRinf. This is due to SDR training, which incorporates the contrastive loss for promoting orthogonality between negative sentence pairs.

Figure 15:
FIG. 15 is an exemplary table illustration ablation study results.

FIG. 15 is an exemplary table 1500 illustration ablation study results. Table 1500 presents an ablation study for SDR, evaluated on the video games and movies datasets. There are no hierarchical inference as the embeddings of the first N tokens of each document are averaged pooled and applied via the cosine function to score the similarity between documents. Paragraph-level inference is considered as the paragraph-similarity matrix is computed directly on the first N tokens of each paragraph. This variant neglects the sentence-similarity matrix from stage 1. The scoring proceeds by stage 2 of the inference. There is no training—the RoBERTa pre-trained weights are used and applied with the proposed hierarchical inference (i.e., no additional training on the given collection of documents). Global normalization is addressed as the SDR inference is applied without globally normalizing the paragraph-similarity matrix. There is no contrastive loss—the SDR training is applied without the contrastive loss term (solely using the MLM objective). The standard cosine loss for the SDR training employs a contrastive loss with margin m=2. This is equivalent to a standard cosine-Similarity loss, which reinforces negative and positive samples to cosine scores of −1 and 1, respectively. The results, shown in table 1500, indicate that the proposed hierarchical inference is highly beneficial, even compared to a paragraph-level inference, that it is crucial to employ the proposed training in the way it is done in SDR, and that it is better to apply global normalization. Particularly noticeable is the contrastive loss, whose gain is present in both (ii) and (iii), for which the biggest degradation in the results took place. Another significant improvement is due to the hierarchical inference, with a leap of 11% in MPR by applying paragraph-level inference, and another 9% by applying the two-stage hierarchy.

The run time of the SDR training is comparable or shorter than the transformer-based baselines and requires a single day of a single V100 GPU. SDR inference runtime for each dataset is shown above. Applying SDR inference can take less than an hour.

FIG. 16 is an exemplary table 1600 illustrating document-to-document recommendations performance evaluated on three datasets. SDR outperforms other alternatives by a sizeable margin. The scores are based on test sets crafted by human experts. All transformer-based models were fine-tuned on the given datasets.

ADDITIONAL EXAMPLES

Some aspects and examples disclosed herein are directed to a system, method and/or computer executable instructions for document-to-document semantic similarity ranking comprising a processor, a computer-readable medium storing instructions, and a data storage device storing a plurality of candidate documents. A document in the plurality of documents includes variable length candidate documents.

The self-supervised language model is pre-trained using sentence pairs produced by inter-and-intra document sampling from the plurality of documents. The sentence pairs comprises intra-sentence pairs obtained from a single document and inter-sentence pairs obtained from a pair of documents in the plurality of documents. The model calculates a two-staged hierarchical similarity matrix for the first candidate document based on the per-sentence embeddings representing each sentence in the candidate document. The two-staged hierarchical similarity matrix comprising a sentence similarity matrix and a paragraph similarity matrix representing contents of the first candidate document. The model generates an inferred similarity score using the paragraph similarity matrix for the first candidate document indicating a degree of semantic similarity between the first candidate document and the source document, wherein the first candidate document has greater semantic similarity to the source document than a second candidate document within the plurality of documents where the inferred similarity score associated with the first candidate document is greater than the inferred similarity score associated with the second candidate document.

Additional aspects and examples disclosed herein are directed to a system, method, or computer executable instructions for self-supervised document similarity ranking. A two-staged hierarchical similarity matrix is calculated for the first candidate document based on the per-sentence embeddings representing each sentence in the candidate document. The two-staged hierarchical similarity matrix comprising a sentence similarity matrix indicating a similarity between a sentence from a paragraph in the source document and a sentence in a paragraph of the candidate document and a paragraph similarity matrix representing contents of the first candidate document. An inferred similarity score is generated using the paragraph similarity matrix for the first candidate document indicating a degree of semantic similarity between the first candidate document and the source document. A rank is assigned to each document in the plurality of documents based on a plurality of semantic similarity scores associated with the plurality of documents, including the inferred similarity score associated with the first candidate document, wherein the first candidate document has greater semantic similarity to the source document than a second candidate document within the plurality of documents where the first candidate document is assigned a higher rank than the second candidate document.

In some examples, the document similarity scoring, ranking and/or predictions can be used for making recommendations regarding similar documents to a query document, recommending similar documents based on one selected document, indexing documents, clustering similar documents, predicting whether a user is likely to select (click) a link, predicting whether a user is likely to find a document helpful or interesting, etc. For clustering, the system can group documents having similar subject matter. For indexing, the system can index documents in accordance with rankings or scores assigned to each document.

In some examples, a self-supervised model for document-to-document similarity, supporting long documents of arbitrary lengths is provided. Document similarities are extracted via a hierarchical bottom-up scoring procedure, which preserves more semantic information, leading to superior similarity results.

Alternatively, or in addition to the other examples described herein, examples include any combination of the following:
  rank each document in the plurality of documents in accordance with the degree of semantic similarity to the source based on the inferred semantic similarity scores, wherein at least one document in the plurality of documents lacks similarity labels;
  generate a recommendation including a subset of documents from the plurality of documents based on the rank assigned to each document in the plurality of documents;
  output the recommendation to a user associated with the source document via a user interface device, wherein the recommendation is provided in an absence of a user profile and historical usage information for the user;
  create the sentence similarity matrix for each paragraph-pair from the source document and the first candidate document based on sentence embeddings for each sentence in a given paragraph, wherein each cell in the sentence similarity matrix indicates a similarity between a sentence from a paragraph in the source doc and a sentence in a paragraph of the candidate document;
  calculate a paragraph-similarity score for each paragraph in the first candidate document based on the sentence similarity matrix, the paragraph-similarity score for a given paragraph indicating similarity between the given paragraph in the candidate document and a corresponding paragraph in the source document;
  aggregate a plurality of paragraph-similarity scores associated with the first candidate document into a paragraph similarity matrix;
  normalize the paragraph similarity matrix for each candidate document in the plurality of documents, wherein a plurality of inferred similarity scores for the plurality of documents are created based on the normalized paragraph similarity matrix for each candidate document in the plurality of documents; and
  apply a masked language model to fine-tune contextual word embeddings to specialize in a given domain associated with the plurality of documents during a pre-training phase.

While the aspects of the disclosure have been described in terms of various examples with their associated operations, a person skilled in the art would appreciate that a combination of operations from any number of different examples is also within scope of the aspects of the disclosure.

Example Operating Environment

FIG. 17 is a block diagram of an example computing device 1700 for implementing aspects disclosed herein and is designated generally as computing device 1700. The computing device 1700 is an example of a suitable computing environment and is not intended to suggest any limitation as to the scope of use or functionality of the examples disclosed herein. Neither should computing device 1700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1700 includes a bus 1710 that directly or indirectly couples the following devices: computer-storage memory 1712, one or more processors 1714, one or more presentation components 1716, I/O ports 1718, I/O components 1720, a power supply 1722, and a network component 1724. While computing device 1700 is depicted as a seemingly single device, multiple computing devices 1700 may work together and share the depicted device resources. For example, memory 1712 may be distributed across multiple devices, and processor(s) 1714 may be housed with different devices.

Bus 1710 represents what may be one or more busses (such as an address bus, data bus, or a combination thereof).

Although the various blocks of FIG. 17 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 17 and the references herein to a "computing device."

Memory 1712 may take the form of the computer-storage media references below and operatively provide storage of computer-readable instructions, data structures, program modules and other data for computing device 1700. In some examples, memory 1712 stores one or more of an operating system, a universal application platform, or other program modules and program data. Memory 1712 is thus able to store and access data 1712*a* and instructions 1712*b* that are executable by processor 1714 and configured to carry out the various operations disclosed herein.

In some examples, memory 1712 includes computer-storage media in the form of volatile and/or nonvolatile memory, removable or non-removable memory, data disks in virtual environments, or a combination thereof. Memory 1712 may include any quantity of memory associated with or accessible by computing device 1700. Memory 1712 may be internal to computing device 1700 (as shown in FIG. 17), external to computing device 1700 (not shown), or both (not shown).

Examples of memory 1712 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1700. Additionally, or alternatively, memory 1712 may be distributed across multiple computing devices 1700, for example, in a virtualized environment in which instruction processing is carried out on multiple computing devices 1700. For the purposes of this disclosure, "computer storage media," "computer storage device", "computer-storage memory," "memory," and "memory devices" are synonymous terms for computer-storage memory 1712, and none of these terms include carrier waves or propagating signaling.

Processor(s) 1714 may include any quantity of processing units that read data from various entities, such as memory 1712 or I/O components 1720 and may include CPUs and/or GPUs. Specifically, processor(s) 1714 are programmed to execute computer-executable instructions for implementing aspects of the disclosure. The instructions may be performed by the processor, by multiple processors within computing device 1700, or by a processor external to client computing device 1700. In some examples, processor(s) 1714 are programmed to execute instructions such as those illustrated in the in the accompanying drawings.

Moreover, in some examples, processor(s) 1714 represent an implementation of analog techniques to perform the operations described herein. For example, the operations may be performed by an analog client computing device 1700 and/or a digital client computing device 1700. Presentation component(s) 1716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1700, across a wired connection, or in other ways. I/O ports 1718 allow computing device 1700 to be logically coupled to other devices including I/O components 1720, some of which may be built in. Example I/O components 1720 include, for example but without limitation, a microphone, joystick, game pad, satellite dish, scanner, printer, wireless device, etc.

Computing device 1700 may operate in a networked environment via network component 1724 using logical connections to one or more remote computers. In some examples, network component 1724 includes a network interface card and/or computer-executable instructions (e.g., a driver) for operating the network interface card. Communication between computing device 1700 and other devices may occur using any protocol or mechanism over any wired or wireless connection.

In some examples, network component 1724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1724 communicates over wireless communication link 1726 and/or a wired communication link 1726*a* to a cloud resource 1728 across network 1730. Various different examples of communication links 1726 and 1726*a* include a wireless connection, a wired connection, and/or a dedicated link, and in some examples, at least a portion is routed through the internet.

Although described in connection with an example computing device 1700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for inferring document-to-document semantic similarities via a self-supervised language model, the system comprising:
   a data storage device comprising a plurality of documents having variable length;
   a computer-readable medium storing instructions that are operative upon execution by a processor to:
   pre-train the self-supervised language model using sentence pairs produced by inter-and-intra document sampling from the plurality of documents, wherein the sentence pairs comprises intra-sentence pairs obtained from a single document and inter-sentence pairs obtained from a pair of documents in the plurality of documents;
   calculate a two-staged hierarchical similarity matrix for a first candidate document based on per-sentence embeddings representing each sentence in the first candidate document, the two-staged hierarchical similarity matrix comprising a sentence similarity matrix and a paragraph similarity matrix representing contents of the first candidate document; and
   generate an inferred similarity score using the paragraph similarity matrix for the first candidate document indicating a degree of semantic similarity between the first candidate document and a source document, wherein the first candidate document has greater semantic similarity to the source document than a second candidate document within the plurality of documents where the inferred similarity score associated with the first candidate document is greater than the inferred similarity score associated with the second candidate document.

2. The system of claim 1, wherein the instructions are further operative to:
   rank each document in the plurality of documents in accordance with the degree of semantic similarity to the source document based on inferred semantic similarity scores, wherein at least one document in the plurality of documents lacks similarity labels.

3. The system of claim 1, wherein the instructions are further operative to:
   generate a recommendation including a subset of documents from the plurality of documents based on rank assigned to each document in the plurality of documents; and
   output the recommendation to a user associated with the source document via a user interface device, wherein the recommendation is provided in an absence of a user profile and historical usage information for the user.

4. The system of claim 1, wherein the instructions are further operative to:
   create the sentence similarity matrix for each paragraph-pair from the source document and the first candidate document based on sentence embeddings for each sentence in a given paragraph, wherein each cell in the sentence similarity matrix indicates a similarity between a sentence from a paragraph in the source document and a sentence in a paragraph of the first candidate document.

5. The system of claim 4, wherein the instructions are further operative to:
   calculate a paragraph-similarity score for each paragraph in the first candidate document based on the sentence similarity matrix, the paragraph-similarity score for a given paragraph indicating similarity between the given paragraph in the first candidate document and a corresponding paragraph in the source document.

6. The system of claim 5, wherein the instructions are further operative to:
aggregate a plurality of paragraph-similarity scores associated with the first candidate document into the paragraph similarity matrix; and
normalize the paragraph similarity matrix for each candidate document in the plurality of documents, wherein a plurality of inferred similarity scores for the plurality of documents are created based on the normalized paragraph similarity matrix for each candidate document in the plurality of documents.

7. The system of claim 1, wherein the instructions are further operative to:
apply a masked language model to fine-tune contextual word embeddings to specialize in a given domain associated with the plurality of documents during a pre-training phase.

8. A method for inferring document-to-document semantic similarities via a self-supervised language model, the method comprising:
calculating a two-staged hierarchical similarity matrix for a first candidate document based on per-sentence embeddings representing each sentence in the first candidate document, the two-staged hierarchical similarity matrix comprising a sentence similarity matrix indicating a similarity between a sentence from a paragraph in a source document and a sentence in a paragraph of the first candidate document and a paragraph similarity matrix representing contents of the first candidate document;
generating an inferred similarity score using the paragraph similarity matrix for the first candidate document indicating a degree of semantic similarity between the first candidate document and the source document; and
ranking each document in a plurality of documents based on a plurality of semantic similarity scores associated with the plurality of documents, including the inferred similarity score associated with the first candidate document, wherein the first candidate document has greater semantic similarity to the source document than a second candidate document within the plurality of documents where the first candidate document is assigned a higher rank than the second candidate document.

9. The method of claim 8, further comprising:
pre-training the self-supervised language model using sentence pairs produced by inter-and-intra document sampling from the plurality of documents, wherein the sentence pairs comprises intra-sentence pairs obtained from a single document and inter-sentence pairs obtained from a pair of documents in the plurality of documents.

10. The method of claim 8, further comprising:
generating a recommendation including a subset of documents from the plurality of documents based on a rank assigned to each document in the plurality of documents; and
outputting the recommendation to a user associated with the source document via a user interface device, wherein the recommendation is provided in an absence of a user profile and historical usage information for the user.

11. The method of claim 8, further comprising:
creating the sentence similarity matrix for each paragraph-pair from the source document and the first candidate document based on sentence embeddings for each sentence in a given paragraph, wherein each cell in the sentence similarity matrix indicates a similarity between a sentence from a paragraph in the source document and a sentence in a paragraph of the first candidate document.

12. The method of claim 8, further comprising:
calculating a paragraph-similarity score for each paragraph in the first candidate document based on the sentence similarity matrix, the paragraph-similarity score for a given paragraph indicating similarity between the given paragraph in the first candidate document and a corresponding paragraph in the source document.

13. The method of claim 8, further comprising:
aggregating a plurality of paragraph-similarity scores associated with the first candidate document into the paragraph similarity matrix; and
normalizing the paragraph similarity matrix for each candidate document in the plurality of documents, wherein a plurality of inferred similarity scores for the plurality of documents are created based on the paragraph similarity matrix for each candidate document in the plurality of documents.

14. The method of claim 8, further comprising:
applying a masked language model to fine-tune contextual word embeddings to specialize in a given domain associated with the plurality of documents during a pre-training phase.

15. One or more computer storage devices having computer-executable instructions stored thereon for inferring document-to-document semantic similarities by a self-supervised language model, which, on execution by a computer, cause the computer to perform operations comprising:
calculate a two-staged hierarchical similarity matrix for a first candidate document based on per-sentence embeddings representing each sentence in the first candidate document, the two-staged hierarchical similarity matrix comprising a sentence similarity matrix associated with each paragraph in the first candidate document and a paragraph similarity matrix representing contents of multiple paragraphs within the first candidate document;
generate an inferred similarity score using the paragraph similarity matrix for the first candidate document, the inferred similarity score indicates a degree of semantic similarity between the first candidate document and a source document; and
rank a plurality of documents in accordance with the inferred similarity score associated with each candidate document in a plurality of documents, wherein the first candidate document has a higher rank than a second candidate document within the plurality of documents where the inferred similarity score indicates the first candidate document has a greater semantic similarity to the source document than the second candidate document.

16. The one or more computer storage devices of claim 15, wherein the operations further comprise:
pre-train the self-supervised language model using sentence pairs produced by inter-and-intra document sampling from the plurality of documents, wherein the sentence pairs comprises intra-sentence pairs obtained from a single document and inter-sentence pairs obtained from a pair of documents in the plurality of documents.

17. The one or more computer storage devices of claim 15, wherein the operations further comprise:
calculate a sentence similarity matrix for the first candidate document based on the per-sentence embeddings representing each sentence in the first candidate document.

18. The one or more computer storage devices of claim 15, wherein the operations further comprise:
generate a sentence similarity score for a given paragraph within the first candidate document based on a sentence similarity matrix associated with the given paragraph.

19. The one or more computer storage devices of claim 15, wherein the operations further comprise:
create the paragraph similarity matrix based on aggregated sentence similarity scores associated with the first candidate document, wherein the paragraph similarity matrix represents contents of the first candidate document.

20. The one or more computer storage devices of claim 15, wherein the operations further comprise:
normalize the paragraph similarity matrix for each candidate document in the plurality of documents, wherein a plurality of inferred similarity scores for the plurality of documents are created based on the normalized paragraph similarity matrix for each candidate document in the plurality of documents.

* * * * *